(12) United States Patent
Wang et al.

(10) Patent No.: US 11,051,040 B2
(45) Date of Patent: Jun. 29, 2021

(54) METHOD AND APPARATUS FOR PRESENTING VR MEDIA BEYOND OMNIDIRECTIONAL MEDIA

(71) Applicant: MediaTek Singapore Pte. Ltd., Singapore (SG)

(72) Inventors: Xin Wang, San Jose, CA (US); Lulin Chen, San Jose, CA (US); Shuai Zhao, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/629,037

(22) PCT Filed: Jul. 13, 2018

(86) PCT No.: PCT/SG2018/050348
§ 371 (c)(1),
(2) Date: Jan. 7, 2020

(87) PCT Pub. No.: WO2019/013712
PCT Pub. Date: Jan. 17, 2019

(65) Prior Publication Data
US 2020/0169754 A1 May 28, 2020

Related U.S. Application Data

(60) Provisional application No. 62/531,906, filed on Jul. 13, 2017.

(51) Int. Cl.
*H04N 13/122* (2018.01)
*H04N 13/332* (2018.01)
(Continued)

(52) U.S. Cl.
CPC ......... *H04N 19/597* (2014.11); *H04N 13/122* (2018.05); *H04N 13/371* (2018.05);
(Continued)

(58) Field of Classification Search
None
See application file for complete search history.

(56) References Cited

U.S. PATENT DOCUMENTS

2015/0022645 A1 1/2015 Bouazizi
2015/0077416 A1 3/2015 Villmer

OTHER PUBLICATIONS

Byeongdoo Choi et al, WD on ISO/IEC 23000-20 Omnidirectional Media Application Format, Jun. 2016, cover page+pages 6-40, ISO/IEC JTC1/SC29/WG11, N16189, Geneva, Switzerland. ,Jun. 30, 2016.

(Continued)

*Primary Examiner* — Patricia I Young
(74) *Attorney, Agent, or Firm* — Wolf, Greenfield & Sacks, P.C.

(57) ABSTRACT

A video processing method includes receiving at least one virtual reality (VR) content, obtaining at least one picture from the at least one VR content, encoding the at least one picture to generate a part of a coded bitstream, and encapsulating, by a file encapsulation circuit, the part of the coded bitstream into at least one ISO Base Media File Format (ISOBMFF) file. The at least one ISOBMFF file includes a first track parameterized with a first set of translational coordinates, wherein the first set of translational coordinates identifies an origin of a first omnidirectional media content.

19 Claims, 15 Drawing Sheets

(51) Int. Cl.
*H04N 13/371* (2018.01)
*H04N 13/373* (2018.01)
*H04N 13/376* (2018.01)
*H04N 19/184* (2014.01)
*H04N 19/597* (2014.01)
*H04N 19/70* (2014.01)

(52) U.S. Cl.
CPC ......... *H04N 13/373* (2018.05); *H04N 13/376* (2018.05); *H04N 19/184* (2014.11); *H04N 19/70* (2014.11)

(56) References Cited

OTHER PUBLICATIONS

Jingwei Huang et al, 6-DOF VR Videos with a Single 360-Camera, Mar. 18-22, 2017, pp. 37-44, IEEE Virtual Reality (VR), CA, USA. ,Mar. 18, 2017.

Xu R., Research and Implementation of Digital Panoramic Image Processing Technology, Thesis for Master of Engineering, Kunming University of Science and Technology, Mar. 31, 2013, China. ,Mar. 31, 2013.

"International Search Report" dated Oct. 1, 2018 for International application No. PCT/SG2018/050348, International filing date Jul. 13, 2018. ,Oct. 1, 2018.

METHOD AND APPARATUS FOR PRESENTING VR MEDIA BEYOND OMNIDIRECTIONAL MEDIA

CROSS REFERENCE TO RELATED APPLICATIONS

This application is a national stage filing under 35 U.S.C. § 371 of International Patent Application Serial No. PCT/SG2018/050348, filed Jul. 13, 2018, which claims the benefit of U.S. provisional application No. 62/531,906, filed on Jul. 13, 2017 and incorporated herein by reference.

BACKGROUND

The present invention relates to processing virtual reality (VR) content, and more particularly, to a method and an apparatus for presenting VR media beyond omnidirectional media.

Virtual reality (VR) has lately gained significant attention primarily driven by the recent market availability of consumer devices, such as head-mounted displays (HMDs). VR with HMDs is associated with a variety of applications. The ability to show wide field of view content to a user can be used to provide immersive visual experiences. A real-world environment has to be captured in all directions, resulting in an omnidirectional VR content. With advances in camera rigs and HMDs, the delivery of omnidirectional VR content may soon become the bottleneck due to the high bitrate required for representing such 360° content.

In recent years, there have been a lot of activities around VR as evidenced by large industry engagement. For example, due to expecting that the increasing popularity of consumer VR HMDs will lead to an increased demand for VR content, various companies have also started to develop omnidirectional cameras to allow capturing of 360° content. However, the lack of appropriate standards and, consequently, reduced interoperability is becoming an issue. Thus, Moving Picture Experts Group (MPEG) has started a project referred to as Omnidirectional Media Application Format (OMAF) that aims at standardizing a storage and delivery format for 360° audio-video content. In the context of OMAF, the storage and delivery format is based on the ISO base media file format (ISOBMFF). However, regarding the developing standard for VR content storage and delivery, there is much room for improvement. For example, there is a need for presenting the VR media beyond the omnidirectional media.

SUMMARY

One of the objectives of the claimed invention is to provide a method and an apparatus for presenting VR media beyond omnidirectional media.

According to a first aspect of the present invention, an exemplary video processing method is provided. The exemplary video processing method includes: receiving at least one virtual reality (VR) content; obtaining at least one picture from said at least one VR content; encoding said at least one picture to generate a part of a coded bitstream; and encapsulating, by a file encapsulation circuit, the part of the coded bitstream into at least one ISO Base Media File Format (ISOBMFF) file, wherein said at least one ISOBMFF file comprises a first track parameterized with a first set of translational coordinates, and the first set of translational coordinates identifies an origin of a first omnidirectional media content.

According to a second aspect of the present invention, an exemplary video processing apparatus is provided. The exemplary video processing apparatus includes a conversion circuit, a video encoder, and a file encapsulation circuit. The conversion circuit is arranged to receive at least one virtual reality (VR) content, and obtain at least one picture from said at least one VR content. The video encoder is arranged to encode said at least one picture to generate a part of a coded bitstream. The file encapsulation circuit is arranged to encapsulate the part of the coded bitstream into at least one ISO Base Media File Format (ISOBMFF) file, wherein said at least one ISOBMFF file comprises a first track parameterized with a first set of translational coordinates, and the first set of translational coordinates identifies an origin of a first omnidirectional media content.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
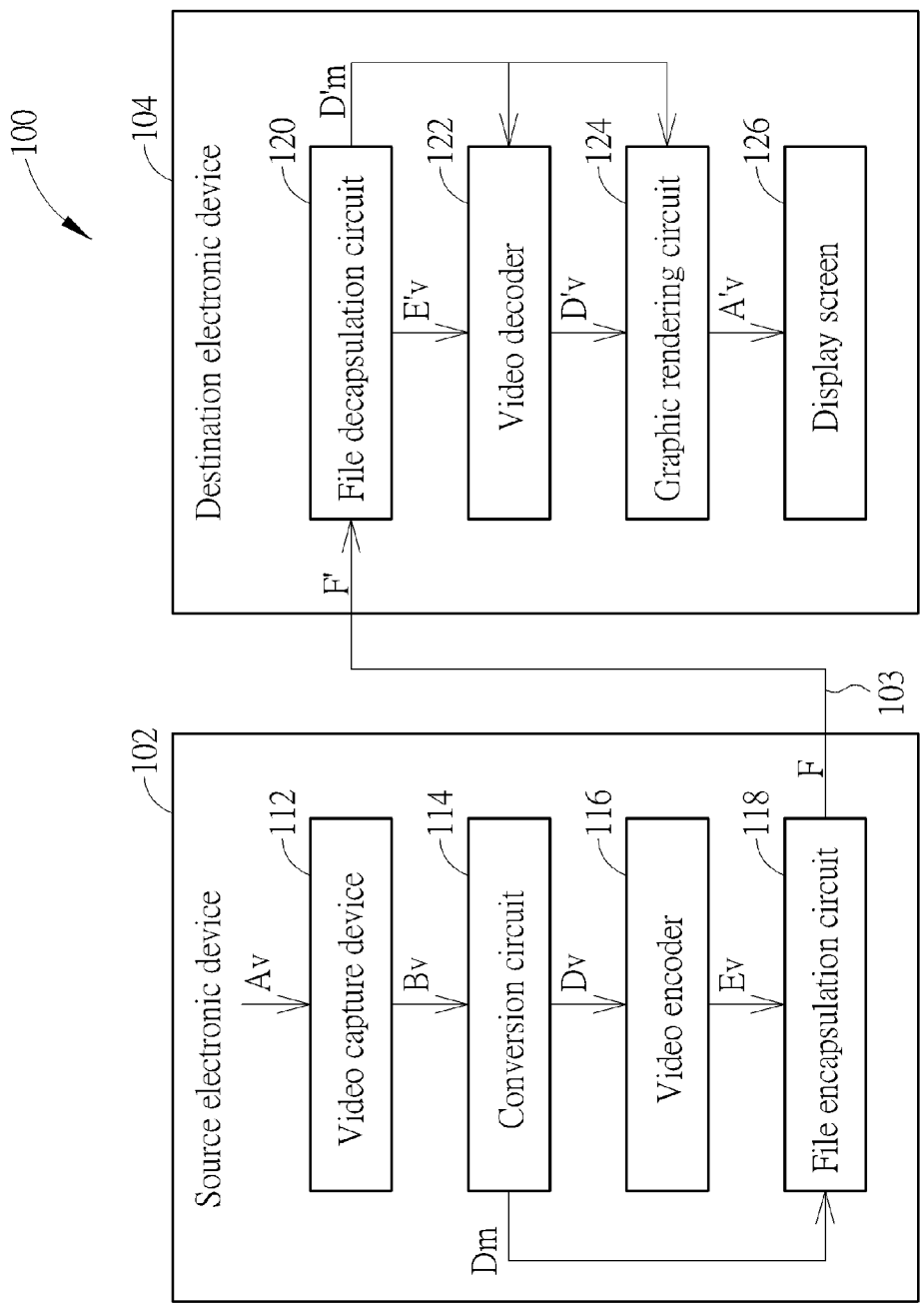
FIG. 1 is a diagram illustrating a Virtual Reality (VR) system according to an embodiment of the present invention.

FIG. 1 is a diagram illustrating a Virtual Reality (VR) system according to an embodiment of the present invention. The VR system 100 includes two video processing apparatuses (e.g., a source electronic device 102 and a destination electronic device 104). The source electronic device 102 includes at least some components selected from a video capture device 112, a conversion circuit 114, a video encoder 116, and a file encapsulation circuit 118. The video capture device 112 is a VR content provider that provides a VR content (e.g., an omnidirectional VR content or a VR content beyond the omnidirectional VR content) By. For example, the video capture device 112 may be a set of cameras used to capture a scene Av in different directions, such that multiple captured images that cover the whole surroundings are generated by the video capture device 112. In some other embodiments, multiple captured images that cover the whole surroundings may be received from more than one source devices, more than one video capture device or a combination of at least one source device and at least one video capture device. In this embodiment, the video capture device 112 may be equipped with video stitching capability. Hence, the contents captured by different cameras of the video capture device 112 may be stitched together to form a stitched image. In addition, the stitched image may be further projected onto a three-dimensional (3D) projection structure (e.g., a sphere). Hence, the video capture device 112 can provide the VR content By on a sphere. Alternatively, with proper moving of the video capture device 112, the video capture device 112 can provide a plurality of VR contents By on a plurality of spheres with different origins in a 3D space, respectively.

The conversion circuit 114 is coupled between the video capture device 112 and the video encoder 116. The conversion circuit 114 generates a picture Dv on a two-dimensional (2D) plane by applying visual pre-processing to one VR content By in the 3D space. When the VR content By corresponds to a sphere in the 3D space, the visual pre-processing performed at the conversion circuit 114 may include projection and optional region-wise packing. Hence, the picture Dv may be a projected picture or a packed picture. The VR content By on the 3D projection structure (e.g., sphere) may be further arranged onto a 2D projected picture via a 360-degree VR (360 VR) projection format. For example, the 360 VR projection format may be an equirectangular projection (ERP) format or a cubemap projection (CMP) format. Assuming that the optional region-wise packing is used, regions on the 2D projected picture are further mapped onto a 2D packed picture.

Figure 2:
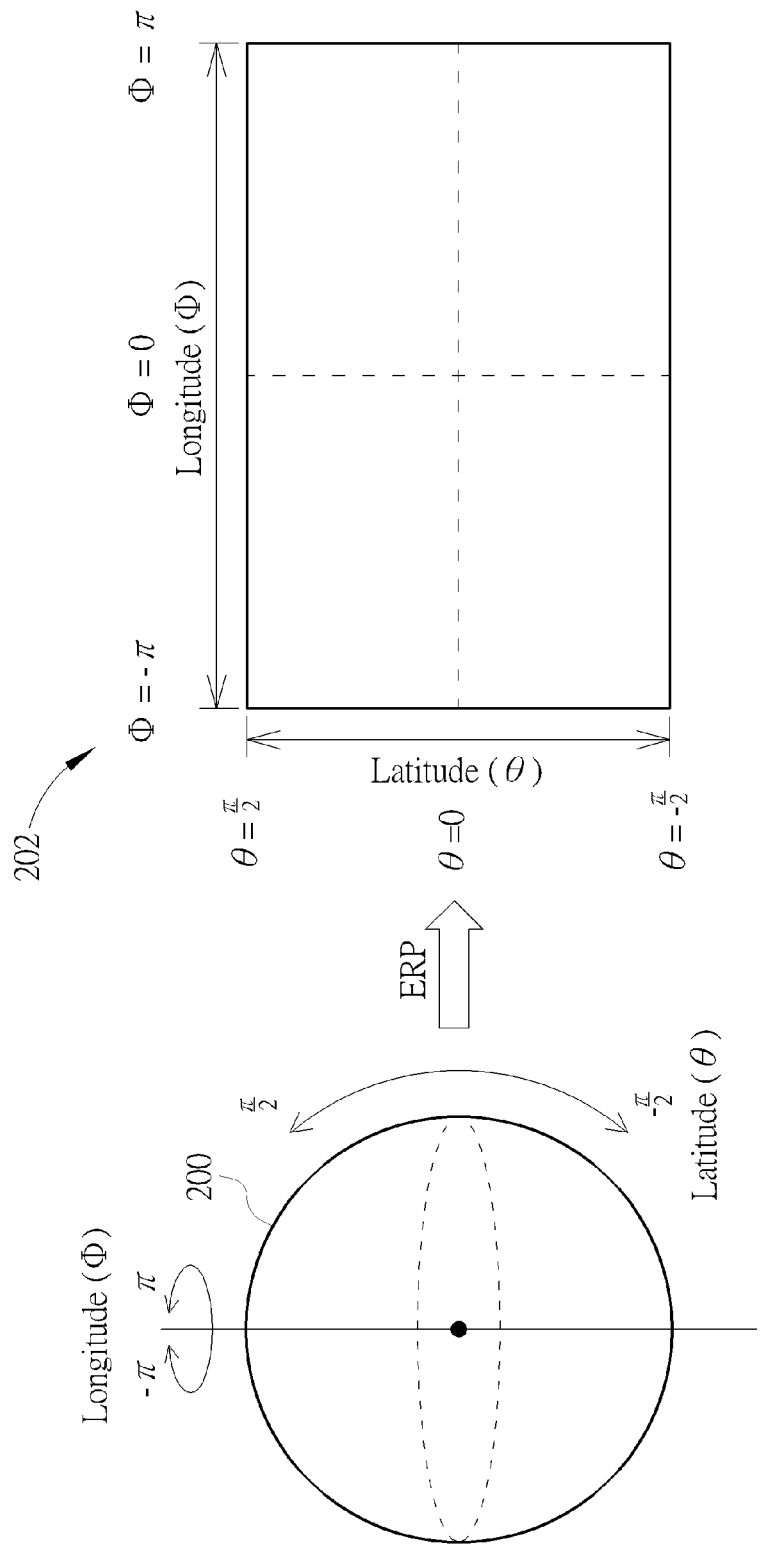
FIG. 2 is a diagram illustrating an equirectangular projection (ERP) according to an embodiment of the present invention.

FIG. 2 is a diagram illustrating an equirectangular projection (ERP) according to an embodiment of the present invention. The VR content By on the sphere 200 is projected onto a rectangular picture 202 on the 2D plane. The sphere 200 is sampled into several horizontal circles (circles of latitudes), and each of those is mapped to a horizontal line of the rectangular picture 202. The horizontal lines towards the upper and lower picture boundary are significantly stretched with respect to their respective circles on the sphere 200.

Figure 3:
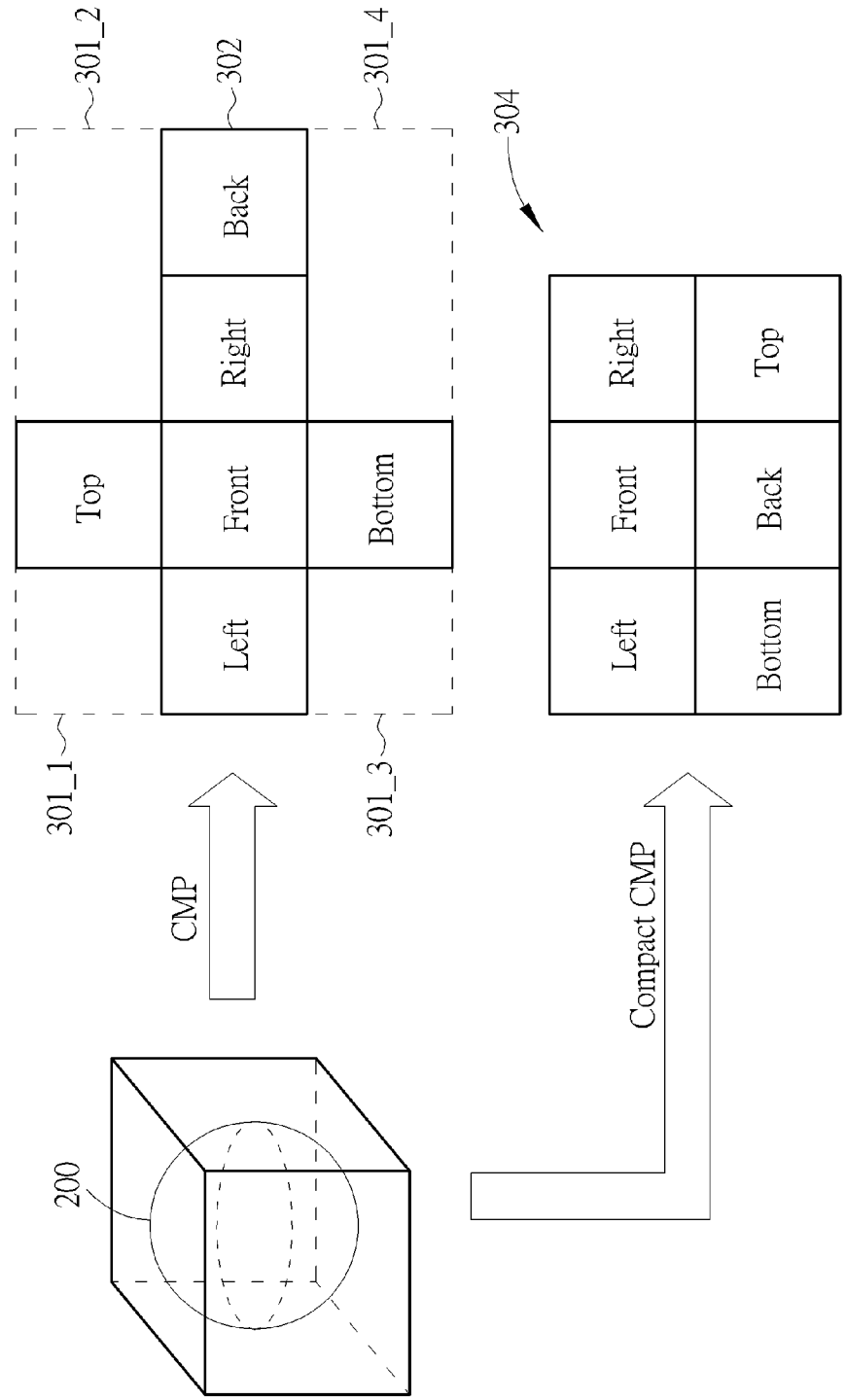
FIG. 3 is a diagram illustrating a cubemap projection (CMP) according to an embodiment of the present invention.

FIG. 3 is a diagram illustrating a cubemap projection (CMP) according to an embodiment of the present invention. The VR content By on the sphere 200 is projected onto six faces of a cube, including a top face (labeled by "Top"), a bottom face (labeled by "Bottom"), a left face (labeled by "Left"), a front face (labeled by "Front"), a right face (labeled by "Right"), and a back face (labeled by "Back"), and the faces are subsequently arranged on the 2D plane. The picture Dv to be encoded is required to be rectangular. If the CMP layout 302 is directly used for creating the picture Dv, the picture Dv is unable to have a compact layout due to many dummy areas (e.g., black areas, gray areas, or white areas) 301_1, 301_2, 301_3, and 301_4 filled in the picture Dv. Alternatively, the picture Dv can have projected image data arranged in the compact CMP layout 304 to avoid using dummy areas (e.g., black areas, gray areas, or white areas).

Figure 4:
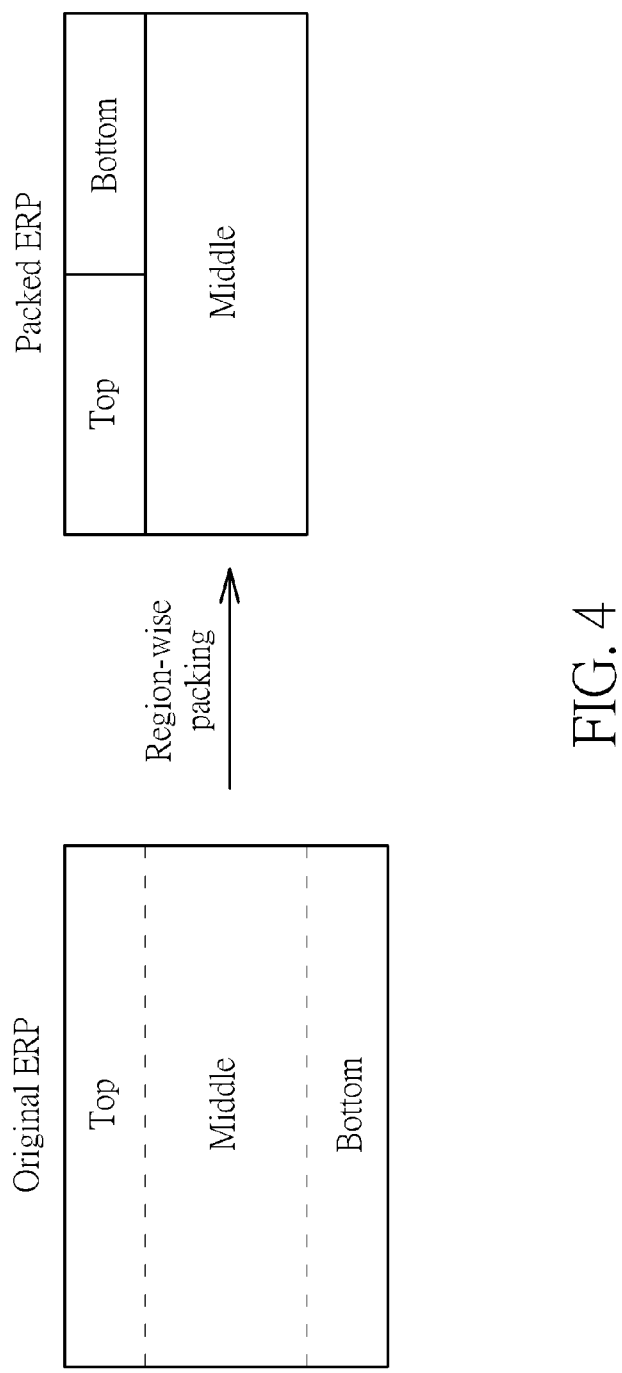
FIG. 4 is a diagram illustrating a first region-wise packing example according to an embodiment of the present invention.
Figure 5:
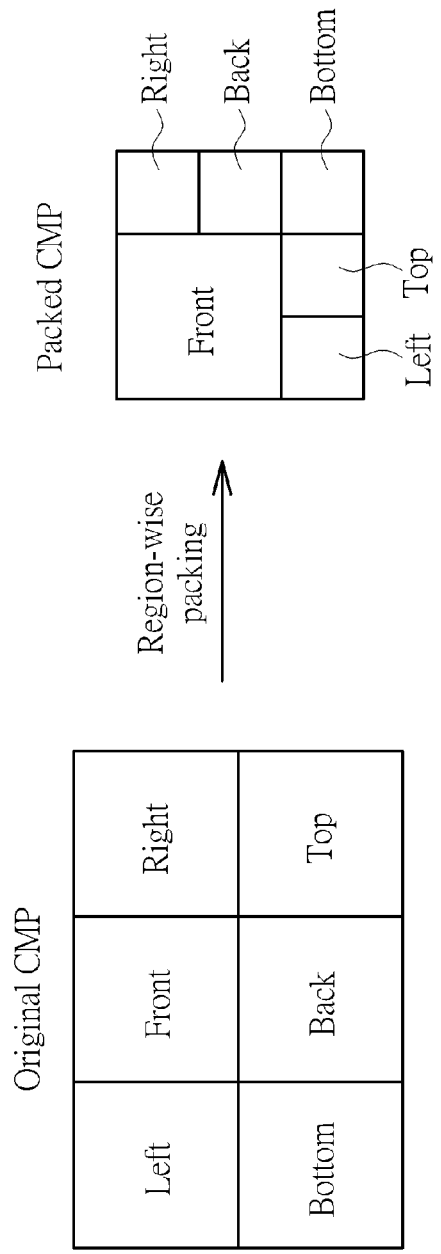
FIG. 5 is a diagram illustrating a second region-wise packing example according to an embodiment of the present invention.

The region-wise packing process may be applied to a projected picture with a particular projection layout (e.g., an ERP layout or a compact CMP layout) prior to encoding. For example, the projected picture is partitioned into a plurality of rectangular regions, and the region-wise packing is applied to the rectangular regions for packing the rectangular regions into a packed picture. Regarding a rectangular region of the projected picture, the region-wise packing may apply translation, scaling, rotation, and/or mirroring to the rectangular region before packing the rectangular region into the packed picture. FIG. 4 is a diagram illustrating a first region-wise packing example according to an embodiment of the present invention. A projected picture with an ERP layout is partitioned into different regions (e.g., a top part, a middle part and a bottom part). The top part, middle part and bottom part can be mapped onto the packed picture via region-wise packing. FIG. 5 is a diagram illustrating a second region-wise packing example according to an embodiment of the present invention. A projected picture with a CMP layout is partitioned into different regions (e.g., a left face, a front face, a right face, a bottom face, a back face and a top face). The left face, front face, right face, bottom face, back face and top face can be mapped onto the packed picture via region-wise packing. It should be noted that the packed pictures shown in FIG. 4 and FIG. 5 are for illustrative purposes only, and are not meant to be limitations of the present invention.

Each picture Dv provided from the conversion circuit 114 may be one video frame included in a sequence of video frames generated from the conversion circuit 114. Each picture Dv may be used to provide an omnidirectional content. In some embodiments of the present invention, a collection of pictures Dv can be used to provide the VR content beyond the omnidirectional VR content. The video encoder 116 is an encoding circuit used to encode/compress the picture Dv of omnidirectional content (or pictures Dv of VR content beyond omnidirectional VR content) to generate a part of a coded bitstream. After receiving the part of the coded bitstream (which includes encoded data Ev of the picture Dv of omnidirectional content, or includes encoded data Ev of pictures Dv of VR content beyond omnidirectional VR content) from the video encoder 116, the file encapsulation circuit 118 encapsulates the part of the coded bitstream into one or more ISOBMFF files F together with additional metadata Dm. For example, the additional metadata Dm may provide additional signaling for dynamic adaptive streaming over HTTP (DASH).

A viewport-dependent streaming scheme, e.g., a tile-based or sub-picture-based streaming scheme, may be employed for 360° video delivery. In accordance with the tile-based streaming scheme, one picture Dv is partitioned into a plurality of tiles (or sub-pictures), each being independently coded. In other words, a tile of the picture Dv is a spatial portion (i.e., a sub-picture) of the picture Dv, and is generally in a rectangular shape. Further, the content of the same tile can be coded in different qualities and bit rates to generate variants of the encoded tile, or can be coded in different codecs and protection schemes to generate variants of the encoded tile. In this case, each of the ISOBMFF files F may be a tile-based file. The file encapsulation circuit 118 encapsulates each of the encoding variants of the same tile into a variant track (i.e., a variant sub-picture track), and encapsulates variant tracks of all encoding variants of the same tile into the same ISOBMFF file F. The metadata Dm may include metadata directly placed in a visual track by using a track metadata box, and/or may include metadata placed in a metadata track (e.g., timed metadata track) associated with the visual track. For example, the signaled metadata Dm may include projection/orientation information, packing information, sub-picture composition information, region of interest (ROI) information, viewport information, etc.

Alternatively, the picture Dv may be directly set by the VR content By on a sphere. Hence, after receiving the part of the coded bitstream (which includes encoded data Ev of the picture Dv) from the video encoder 116, the file encapsulation circuit 118 encapsulates the part of the coded bitstream into one or more ISOBMFF files F together with additional metadata Dm, where a sphere video track (i.e., VR 3D video track) is included in the ISOBMFF files F. However, this is for illustrative purposes only, and is not meant to be a limitation of the present invention. For example, the sphere video track (i.e., VR 3D video track) may be a derived track whose media data can be obtained from track derivation that is performed at a VR application end (i.e., destination electronic device 104) and is based at least partly on visual tracks with media data in the ISOBMFF files F/F'.

The file encapsulation circuit 118 outputs the ISOBMFF files F to the destination electronic device 104 via a transmission means 103. For example, the transmission means 103 may be a wired/wireless communication link, and the ISOBMFF files F are delivered to the destination electronic device 104 over HTTP using unicast, multicast or broadcast delivery. In some other embodiments, the ISOBMFF files F can be provided to the destination electronic device 104 using any other storage medium, which should not be limited in this disclosure.

The destination electronic device 104 may be a head-mounted display (HMD) device. As shown in FIG. 1, the destination electronic device 104 includes a file decapsulation circuit 120, a video decoder 122, a graphic rendering circuit 124, and a display screen 126. The file decapsulation circuit 120 receives ISOBMFF files F' from the transmission means 103. If there are no transmission errors, ISOBMFF files F' received by the file decapsulation circuit 120 should be the same as ISOBMFF files F output from the file encapsulation circuit 118. After receiving the ISOBMFF files F', the file decapsulation circuit 120 decapsulates the ISOBMFF files F' into a part of a coded bitstream (which includes an encoded data E'v of a picture to be reconstructed for omnidirectional media presentation, or includes encoded data E'v of a plurality of pictures to be reconstructed for VR media presentation beyond omnidirectional media presentation), and extracts/parses the accompanying metadata D'm from the ISOBMFF files F'. If there are no transmission errors and decapsulation errors, the metadata D'm extracted/parsed from the ISOBMFF files F' should be the same as the metadata Dm added to the ISOBMFF files F.

The video decoder 122 is coupled between the file decapsulation circuit 120 and the graphic rendering circuit 124, and is a decoding circuit arranged to decode the part of the coded bitstream according to the extracted/parsed metadata D'm. For example, the video decoder 122 decodes the part of the coded bitstream to obtain decoded data D'v of a viewport (e.g., an initial viewport or a recommended viewport) specified by the signaled metadata D'm. The graphic rendering circuit 124 is a post-processing circuit arranged to render and display the viewport on the display screen 126 according to display data A'v obtained from the decoded data of the viewport.

Recently, new video applications have emerged. In particular, 360 video (a.k.a. omnidirectional video, spherical video) and virtual reality (VR) use cases, which capture a real-world panorama, have drawn significant attention. MPEG is standardizing an application format "Omnidirectional Media Application Format (OMAF)", to specify format for storage, delivery, rendering of omnidirectional media content. In the Committee Draft (CD) of OMAF, timed metadata for regions on sphere is signaled, which can be used to indicate one or more viewpoints and viewports.

Figure 6:
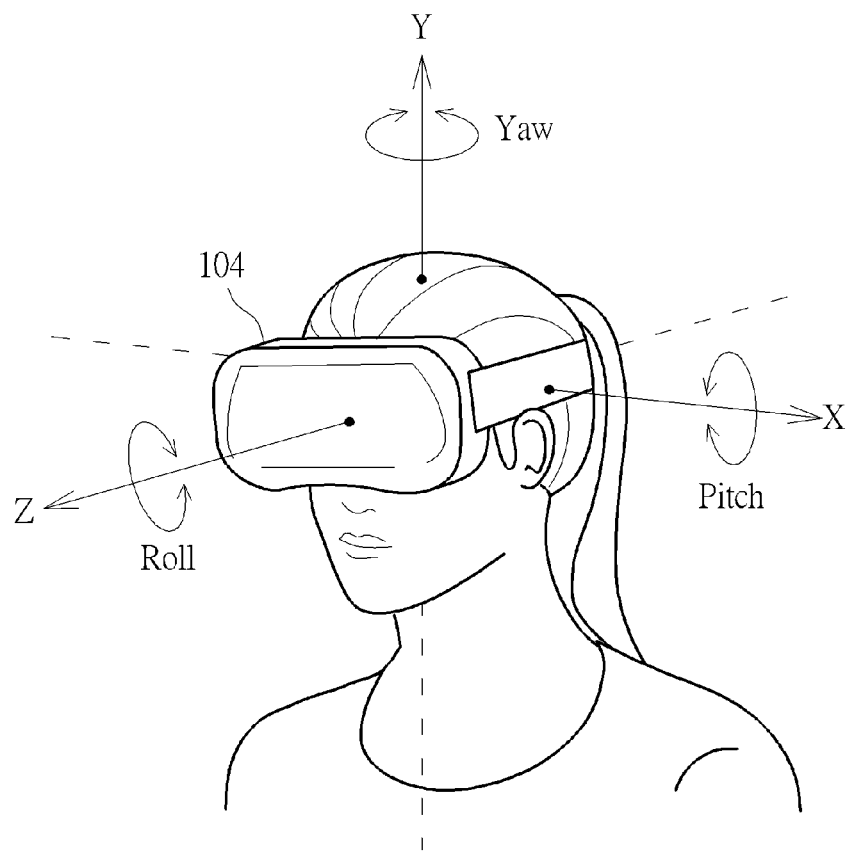
FIG. 6 is a diagram illustrating movement of a destination electronic device according to an embodiment of the present invention.

FIG. 6 is a diagram illustrating movement of the destination electronic device 104 according to an embodiment of the present invention. As mentioned above, the destination electronic device 104 may be an HMD device worn on the user's head or any other device capable of displaying Virtual Reality content. Hence, orientation of the destination electronic device 104 is also the viewing orientation of the user, and can be specified by a yaw angle along the Y axis, a pitch angle along the X axis, and a roll angle along the Z axis. If the orientation of the destination electronic device 104 changes, the location and/or the shape of the viewport on a sphere change.

Figure 7:
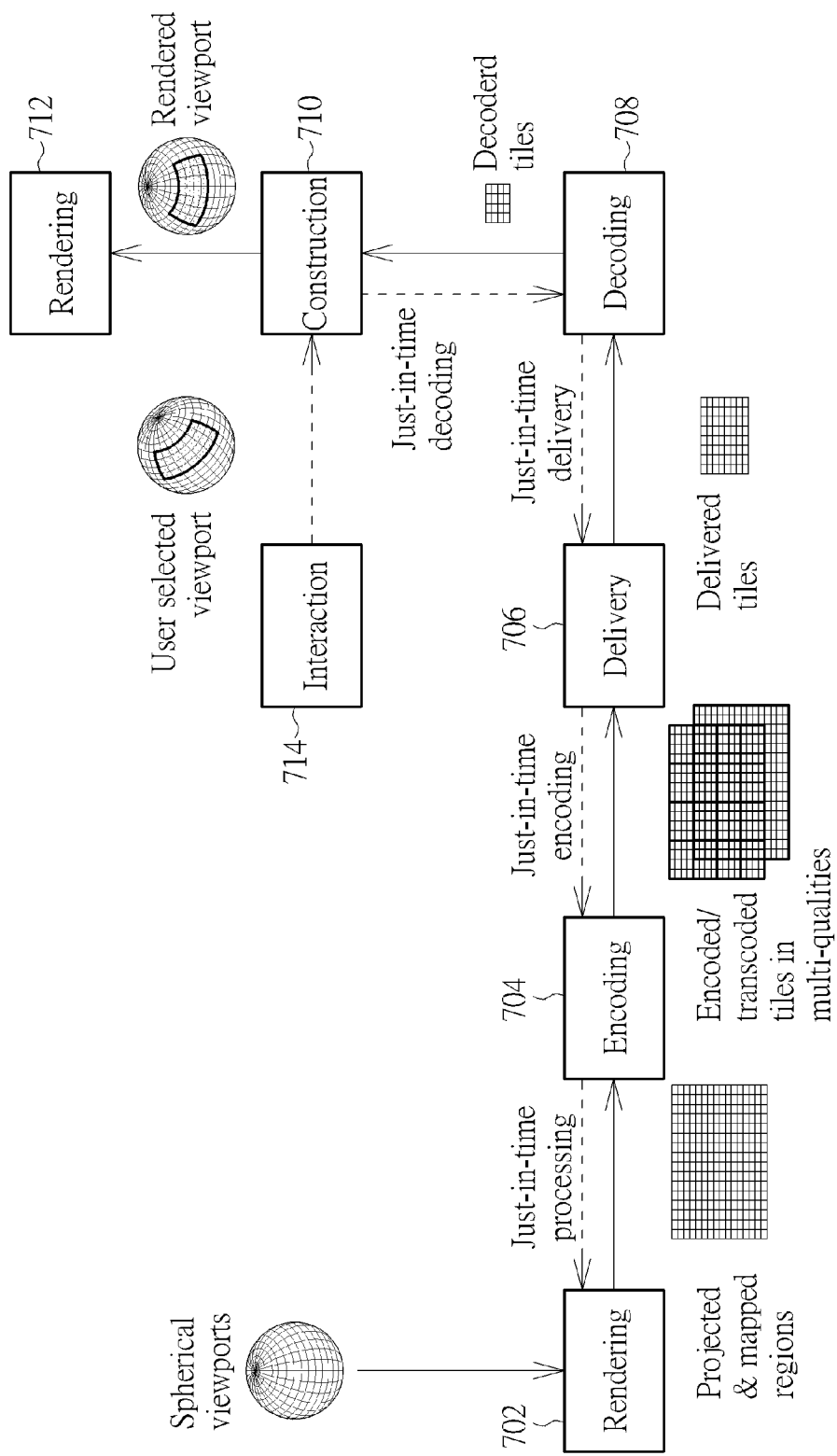
FIG. 7 is a diagram illustrating one VR streaming architecture according to an embodiment of the present invention.

FIG. 7 is a diagram illustrating one VR streaming architecture according to an embodiment of the present invention. Step 702 may be performed at the video capture device 112 and/or the conversion circuit 114 shown in FIG. 1. Step 704 may be performed at the video encoder 116 shown in FIG. 1. Step 706 may be performed at the transmission means 103 shown in FIG. 1. Step 708 may be performed at the video decoder 122 shown in FIG. 1. Steps 710 and 712 may be performed at the graphic rendering circuit 124 shown in FIG. 1. Step 714 may be performed by a head/eye tracking function of the VP application end (i.e., destination electronic device 104).

MPEG has recently started its planning for development of MPEG-I standards in support of Immersive Media, including those for 360° (or Omnidirectional) Audiovisual Media. While the standardization for the first version of the Omnidirectional Media Format (OMAF) is to be finished in the year of 2017, the standard work for VR media types beyond Omnidirectional Media are still in the use case and requirement stage.

Figure 8:
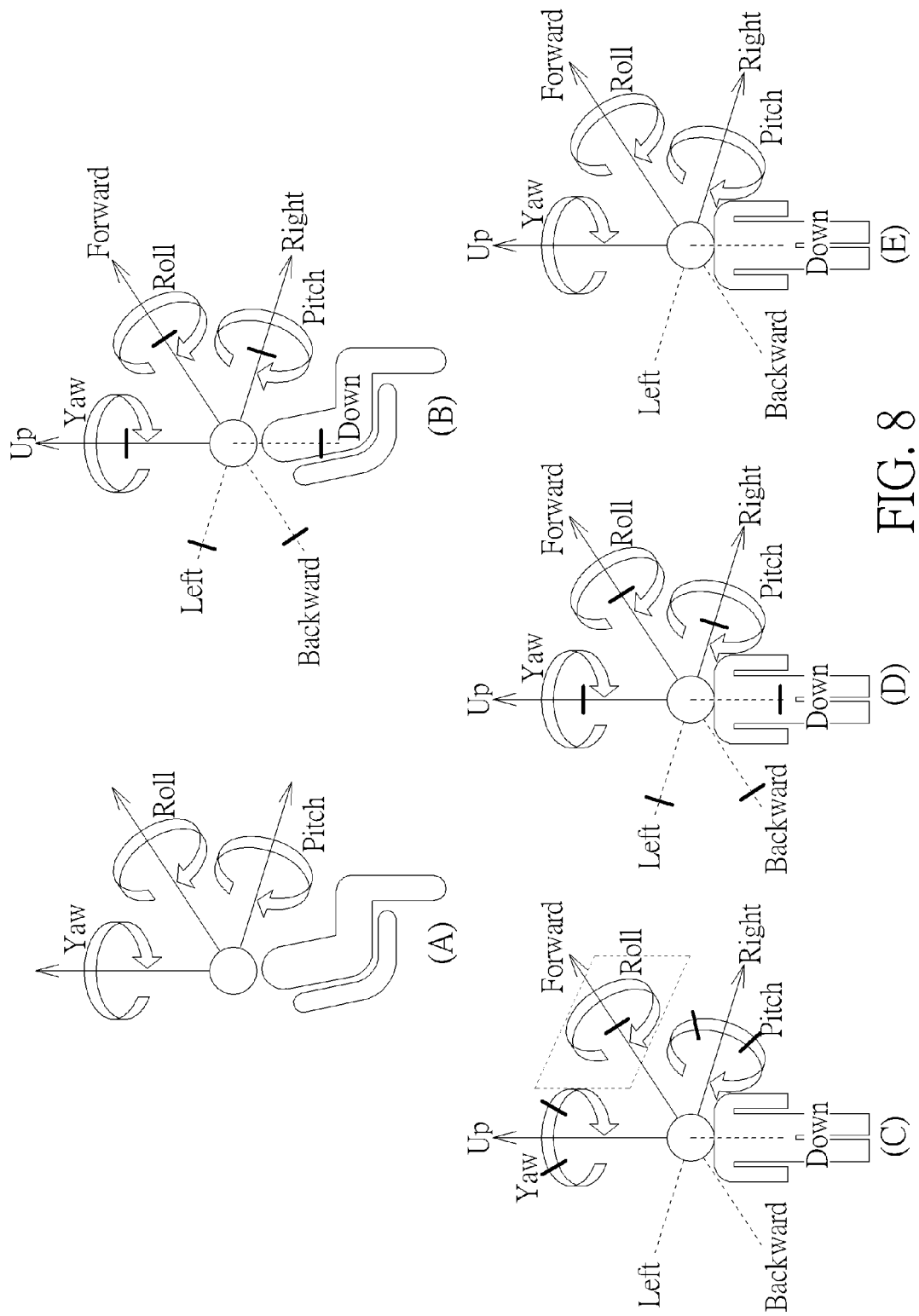
FIG. 8 is a diagram illustrating different types of VR (or immersive) media in terms of constraints on degrees of freedom (DoF).

FIG. 8 is a diagram illustrating different types of VR (or immersive) media in terms of constraints on degrees of freedom (DoF). The sub-diagram (A) of FIG. 8 illustrates the 3DoF VR experience. There are three rotational and un-limited movements around the X, Y and Z axes (respectively pitch, yaw and roll). A typical use case is a user sitting on a chair looking at 3D 360 VR content on an HMD. That is, omnidirectional media content is presented and viewed by the user under the 3DoF VR experience. The sub-diagram (B) of FIG. 8 illustrates the 3DoF+VR experience. 3DoF+ is regarded as 3DoF with additional limited translational movements (typically, head movements) along X, Y and Z axes. A typical use case is a user sitting on a chair looking at 3D 360 VR content on an HMD with the capability to slightly move his head up/down, left/right and forward/backward. In some other embodiments, a user may not sit on a chair to look at 3D 360 VR content on an HMD for 3DoF or 3DoF+VR experience, which should not be limited in this disclosure. The sub-diagram (C) of FIG. 8 illustrates the windowed 6DoF (W 6DoF) VR experience. Windowed 6DoF is regarded as 6DoF with constrained rotational movements around X and Y axes (respectively pitch and yaw) and constrained translational movements along Z axis. A typical use case is a user watching a windowed VR content; the user cannot look outside the window frame and cannot walk through the window. The sub-diagram (D) of FIG. 8 illustrates the omnidirectional 6DoF (O 6DoF) VR experience. Omnidirectional 6DoF is regarded as 6DoF with constrained translational movements along X, Y and Z axes (typically, a couple of steps walking distance). A typical use case is a user freely walking through 3D 360 VR content (physically or via dedicated user input means) displayed on an HMD but within a constrained walking area. The sub-diagram (E) illustrates the 6DoF VR experience. 6DoF is regarded as 3DoF with full translational movements along X, Y and Z axes. A typical use case is a user freely walking through 3D 360 VR content (physically or via dedicated user input means) displayed on an HMD. The complexity of different VR types has the following order: 3DoF→3DoF+→W 6DoF→O 6DoF→6DoF, where 3DoF has the lowest complexity, and 6DoF has the highest complexity.

The OMAF standard (ISO/IEC 23090, part 2) only supports 3DOF immersive media experiences, in which any translational movement of the user does not result in different omnidirectional media being rendered to the user. To address this issue, embodiments of the present invention disclose a generic approach to support immersive media experiences of other types, by leveraging the standard for the 3DoF ones. More specifically, embodiments of the present invention consider each of the other VR media types as a discrete collection of 3DoF ones parameterized with translational coordinates and possibly depth information (e.g., a zooming factor), and proposes new file format track grouping mechanisms in the ISOBMFF for grouping media (including video, audio, image, subtitle, and application) and metadata tracks of individual 3DoF media presentations, so that media formats for coding, storage, delivery, and rendering of VR media of other types can be defined by leveraging the media format for the 3DoF media type.

With these track grouping mechanisms, media formats can be defined to support the other VR media types as follows:

3DoF+: a limited collection of 3DoF media presentations, each of which is parameterized with a set of translation coordinates. The limited translational movements for 3DoF+ are reflected in the changes in the translation coordinates and/or the zooming factors among the 3DoF media presentations in the collection.

6DoF: a collection of 3DoF media presentations, each of which is parameterized with a set of translation coordinates. The translational movements for 3DoF+ are reflected in the changes in the translation coordinates among the 3DoF media presentations in the collection.

Windowed 6DoF: a collection of 3DoF media presentations, each of which is parameterized with a set of translation coordinates, has a partial spherical coverage limited by the view window in the windowed 6DoF, constraining rotational movements around X and Y axes (respectively pitch and yaw). The constrained translational movements along Z axis are reflected in a range of the changes in the z-axis coordinates, together with a zooming factor, among the 3DoF media presentations in the collection.

Omnidirectional 6DoF: a collection of 3DoF media presentations, each of which is parameterized with a set of translation coordinates. The constrained translational movements along X, Y and Z axes for omnidirectional 6DoF are reflected in ranges of the changes in the X, Y, Z coordinates among the 3DoF media presentations in the collection.

Figure 9:
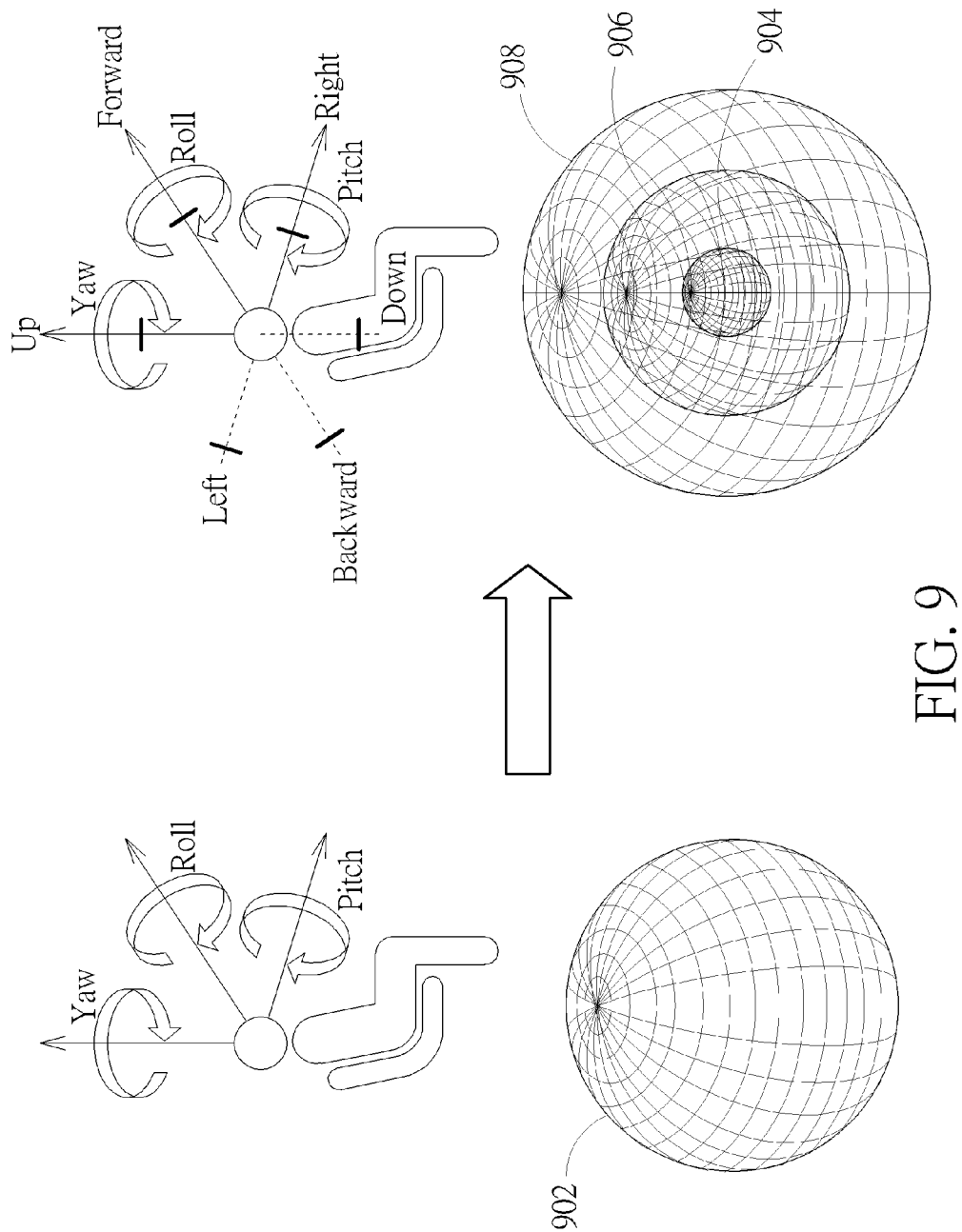
FIG. 9 is a diagram illustrating multiple nested spheres with the same origin that can be used to provide 3DoF+ VR experience according to an embodiment of the present invention.

For instance, with the track grouping mechanisms, 3DoF+ can be considered as an extension of 3DoF from a single sphere to multiple nested spheres with the same origin. FIG. 9 is a diagram illustrating multiple nested spheres with the same origin that can be used to provide 3DoF+VR experience according to an embodiment of the present invention. A single sphere 902 can provide an omnidirectional VR content for 3DoF VR experience. 3DoF+ can be considered as an extension of 3DoF from the single sphere 902 to multiple nested spheres (e.g., 904, 906, and 908) with the same origin. The spheres 904, 906, and 908 correspond to different zooming factors, respectively. Note that when used in an HMD, zooming will be akin to using binoculars, and when used on a "flat" device, zooming can be implemented by pinching in addition to the swiping that moves a viewport or any other pre-defined operation for zooming function. The VR content By provided by the video capture device 112 shown in FIG. 1 may include an omnidirectional VR content of the sphere 904 with a first zooming factor, an omnidirectional VR content of the sphere 906 with a second zooming factor, and an omnidirectional VR content of the sphere 908 with a third zooming factor. The spheres 904, 906, and 908 have the same origin specified by a set of translational coordinates (x, y, z) in the 3D space. By way of example, but not limitation, the first zooming factor may be smaller than the second zooming factor, and the second zooming factor may be smaller than the third zooming factor.

Figure 10:
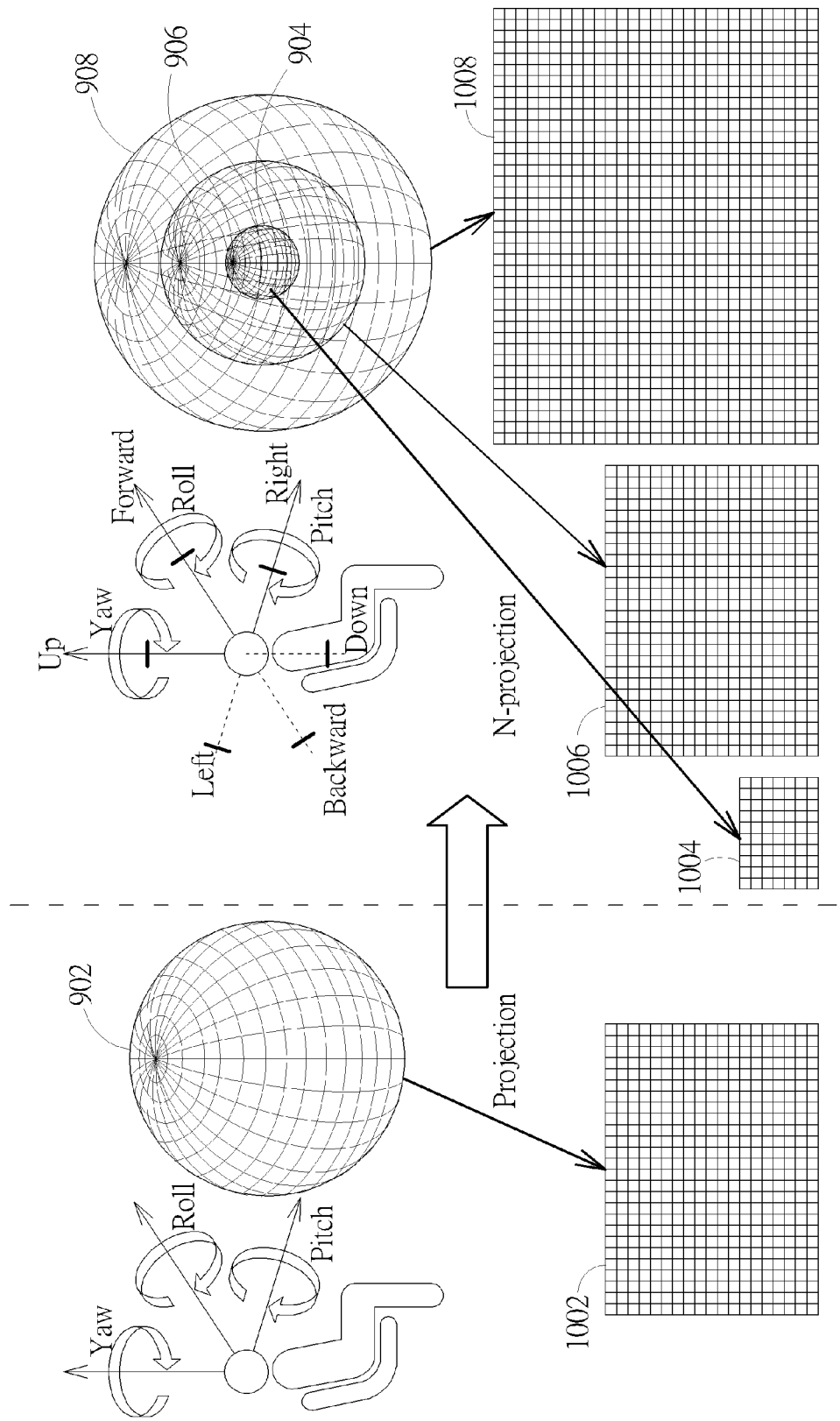
FIG. 10 is a diagram illustrating multiple projected pictures generated on multiple projected planes to provide 3DoF+ VR experience according to an embodiment of the present invention.

As mentioned above, the conversion circuit 114 generates one picture Dv on a 2D plane by applying visual pre-processing to one VR content By in the 3D space. FIG. 10 is a diagram illustrating multiple projected pictures generated on multiple projected planes to provide 3DoF+VR experience according to an embodiment of the present invention. The single sphere 902 can provide an omnidirectional VR content for 3DoF VR experience. The visual pre-processing performed at the conversion circuit 114 may include projection applied to the omnidirectional VR content of the sphere 902 to generate a projected picture 1002 for further processing. The present invention proposes using multiple nested spheres 904, 906, and 908 with the same origin to provide omnidirectional VR contents for 3DoF+ VR experience. The visual pre-processing performed at the conversion circuit 114 may include projection applied to the omnidirectional VR content of the sphere 904 to generate a projected picture 1004 on a first projected plane, projection applied to the omnidirectional VR content of the sphere 906 to generate a projected picture 1006 on a second projected plane, and projection applied to the omnidirectional VR content of the sphere 908 to generate a projected picture 1008 on a third projected plane. The projected pictures 1004, 1006, and 1008 are provided to the following video encoder 116 for encoding.

Figure 11:
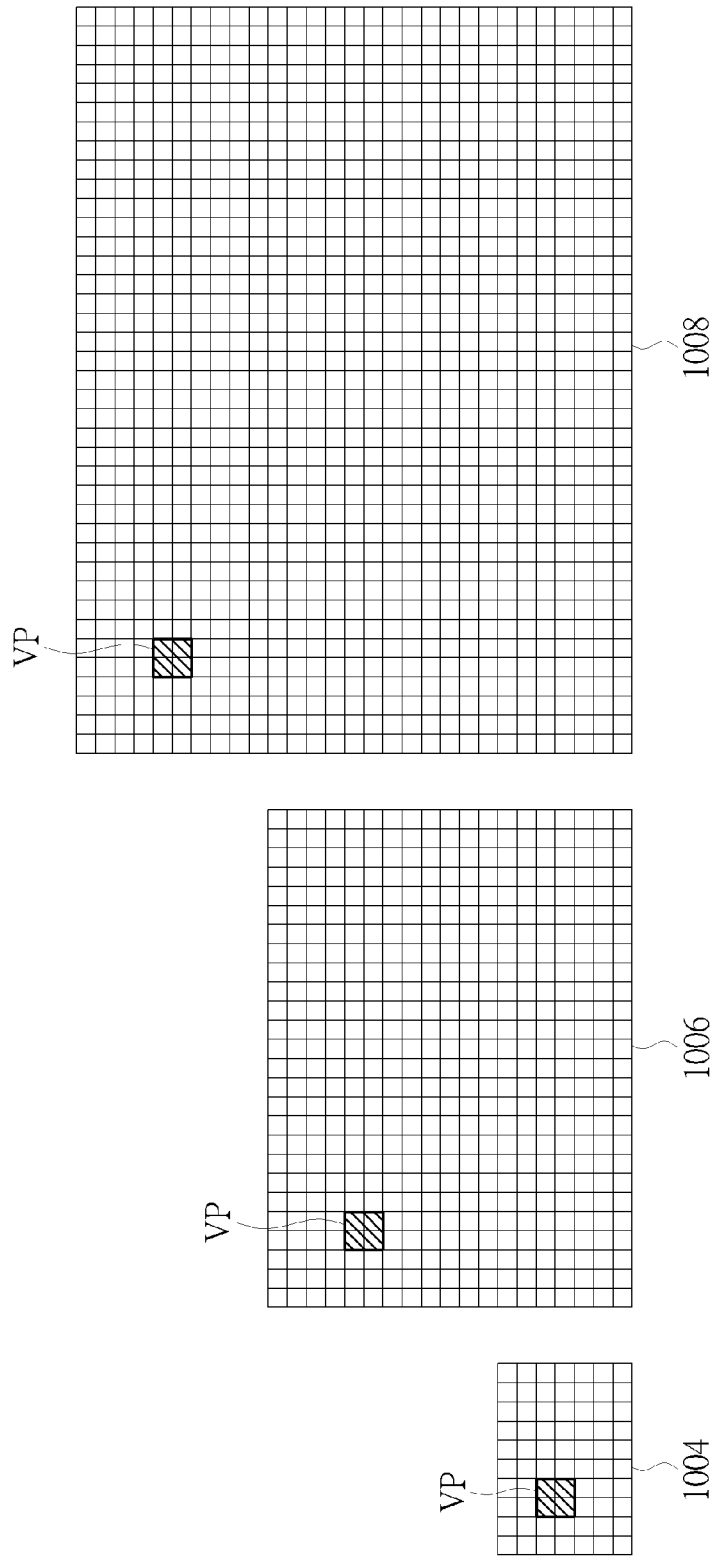
FIG. 11 is a diagram illustrating viewport zooming on different 2D planes according to an embodiment of the present invention.

FIG. 11 is a diagram illustrating viewport zooming on different 2D planes according to an embodiment of the present invention. The picture size (i.e., width×height) of the projected picture 1004 is smaller than the picture size (i.e., width×height) of the projected picture 1006, and the picture size (i.e., width×height) of the projected picture 1006 is smaller than the picture size (i.e., width×height) of the projected picture 1008. The resolution of the projected picture 1004 is lower than the resolution of the projected picture 1006, and the resolution of the projected picture 1006 is lower than the resolution of the projected picture 1008. In this example, the same scene Av may be captured by the video capture device 112 with different zooming settings to generate omnidirectional VR contents of the nested spheres 904, 906, and 908 with the same origin but different zooming factors. Suppose that the second zooming factor associated with the sphere 906 is set by a value equal to zero, the first zooming factor associated with the sphere 904 may be set by a negative value, and the third zooming factor associated with the sphere 908 may be set by a positive value. Note that the size of the viewport VP is fixed. A spherical region (e.g., viewport VP) on the omnidirectional VR content of the sphere 906 can be determined from inverse projection of a first rectangular region on the projected picture 1006 for presenting a normal view, a spherical region (e.g., viewport VP) on the omnidirectional VR content of the sphere 904 can be determined from inverse projection of a second rectangular region on the projected picture 1004 for presenting a zoom-out view, and a spherical region (e.g., viewport VP) on the omnidirectional VR content of the sphere 908 can be determined from inverse projection of a third rectangular region on the projected picture 1008 for presenting a zoom-in view, where the first rectangular region, the second rectangular region, and the third rectangular region have the same size.

As shown in FIG. 11, the viewport VP can be switched between different nested spheres with the same origin but different zooming factors. However, this is for illustrative purposes only, and is not meant to be a limitation of the present invention. In some embodiments of the present invention, the viewport VP can be switched between different spheres with different origins but a same zooming factor. In some embodiments of the present invention, the viewport VP can be switched between different spheres with different origins and different zooming factors.

Figure 12:
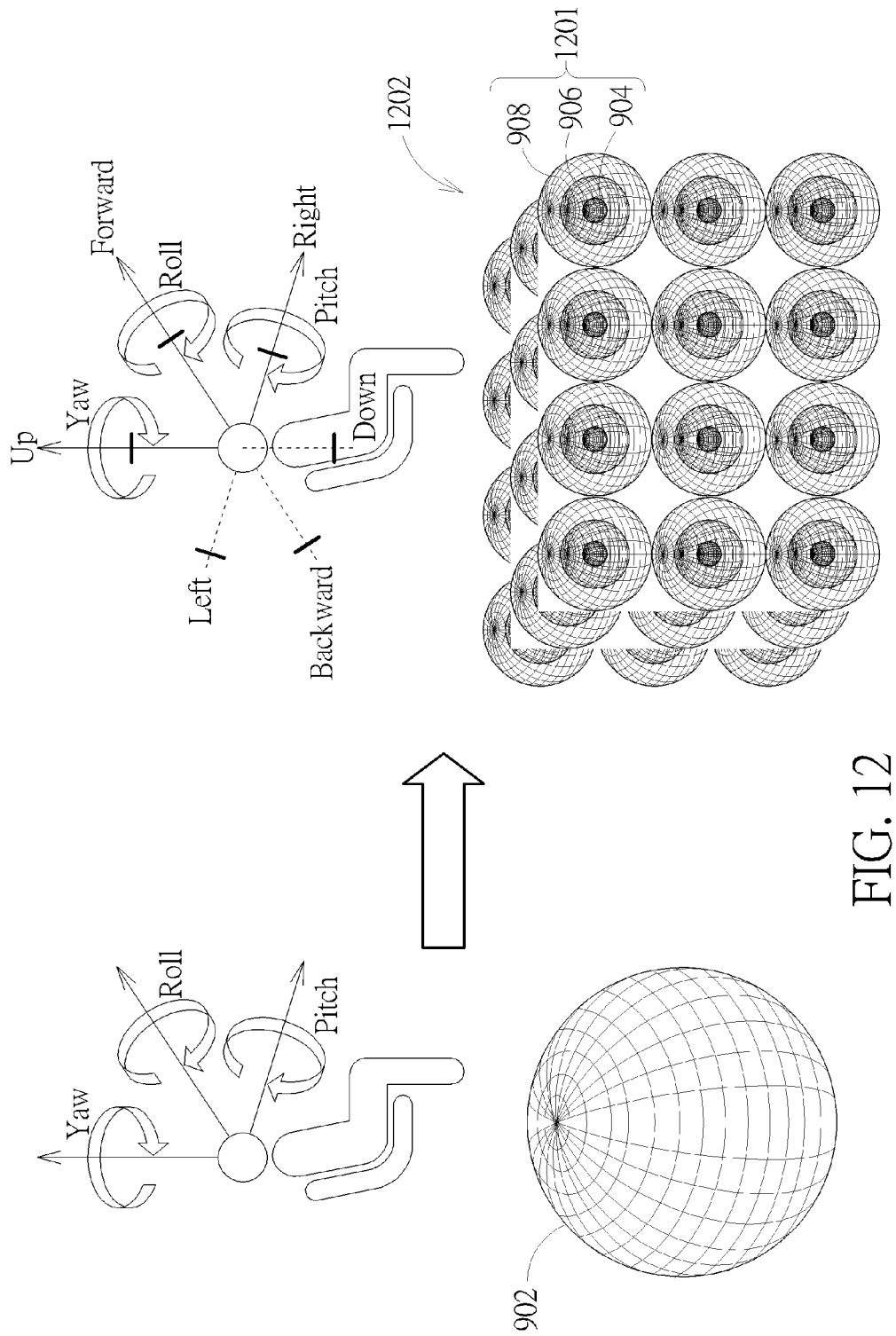
FIG. 12 is a diagram illustrating a 3D array of nested sphere groups that can be used to provide 3DoF+VR experience according to an embodiment of the present invention.

FIG. 12 is a diagram illustrating a 3D array of nested sphere groups that can be used to provide 3DoF+VR experience according to an embodiment of the present invention. A single sphere 902 can provide an omnidirectional VR content for 3DoF VR experience. 3DoF+ can be considered as an extension of 3DoF from the single sphere 902 to a 3D array 1202 of nested sphere groups 1201, wherein different nested sphere groups 1201 have origins at different positions in a 3D space, respectively, and each nested sphere group 1201 has multiple nested spheres (e.g., 904, 906, and 908) with the same origin but different zooming factors. In a first case where a user sitting on a chair looking at 3D 360 VR content on an HMD wants to have 3DoF+VR experience by moving his head up/down, left/right and/or forward/backward without enabling the zooming function, a transition of a viewport is enabled by viewport switching between different spheres with different origins but a same zooming factor. In a second case where a user sitting on a chair looking at 3D 360 VR content on an HMD wants to have 3DoF+VR experience by enabling the zooming function during head movement, a transition of a viewport is enabled by viewport switching between different spheres with different origins and different zooming factors. In a third case where a user sitting on a chair looking at 3D 360 VR content on an HMD wants to have 3DoF+VR experience by enabling the zooming function without head movement, a transition of a viewport is enabled by viewport switching between different nested spheres with the same origin but different zooming factors.

Figure 13:
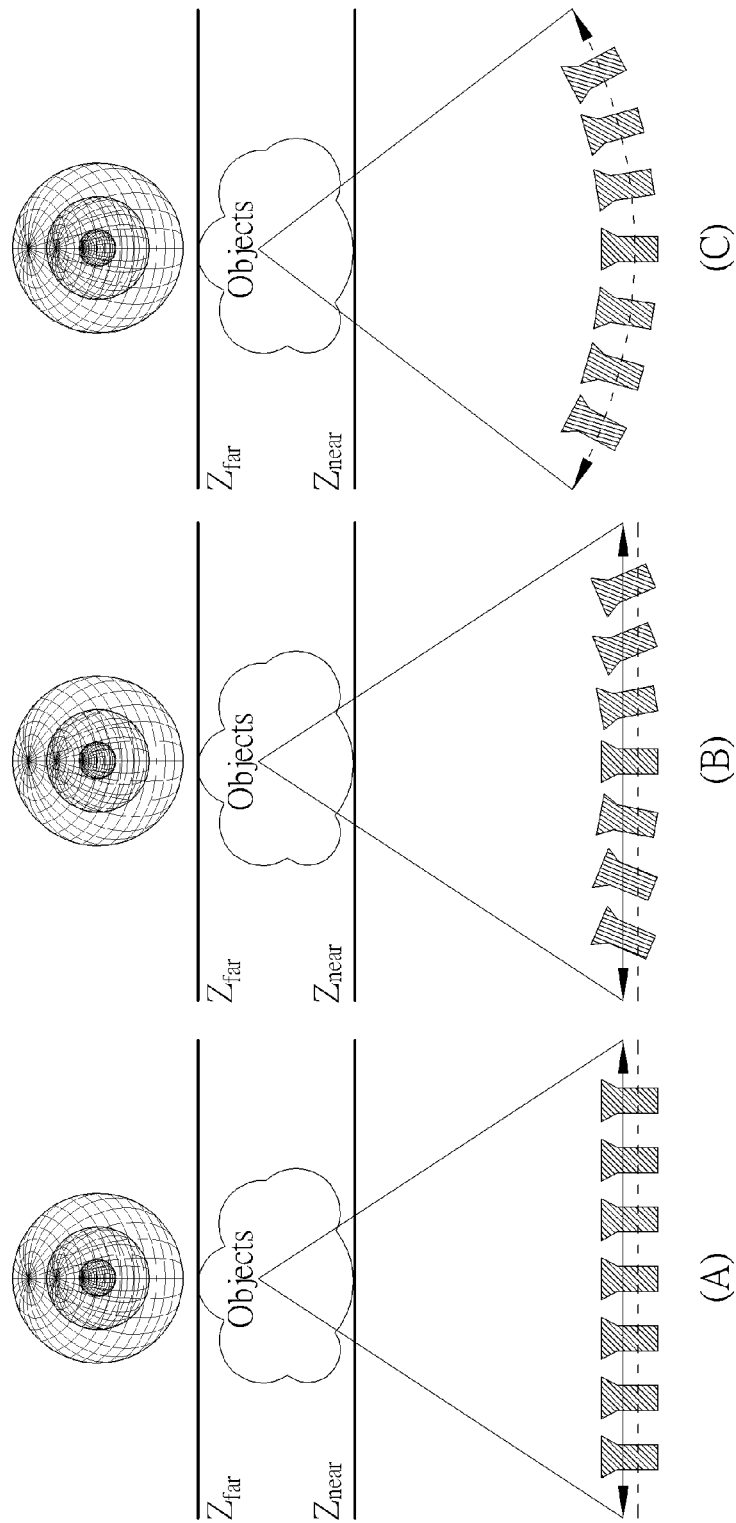
FIG. 13 is a diagram illustrating a windowed 6DoF case according to an embodiment of the present invention.

Similarly, the other VR media types (e.g., 6DoF, omnidirectional 6DoF, and windowed 6DoF) can be considered as an extension of the 3DoF one from a single sphere to a collection of spheres whose origin positions form a 3D array or field. FIG. 13 is a diagram illustrating a windowed 6DoF case according to an embodiment of the present invention. The spherical content within a window may be captured using different arrangements of cameras, as illustrated in sub-diagrams (A), (B), and (C) of FIG. 13. In addition, a zooming factor in the range $\{Z_{near}, Z_{far}\}$ may be selected by the user.

Figure 14:
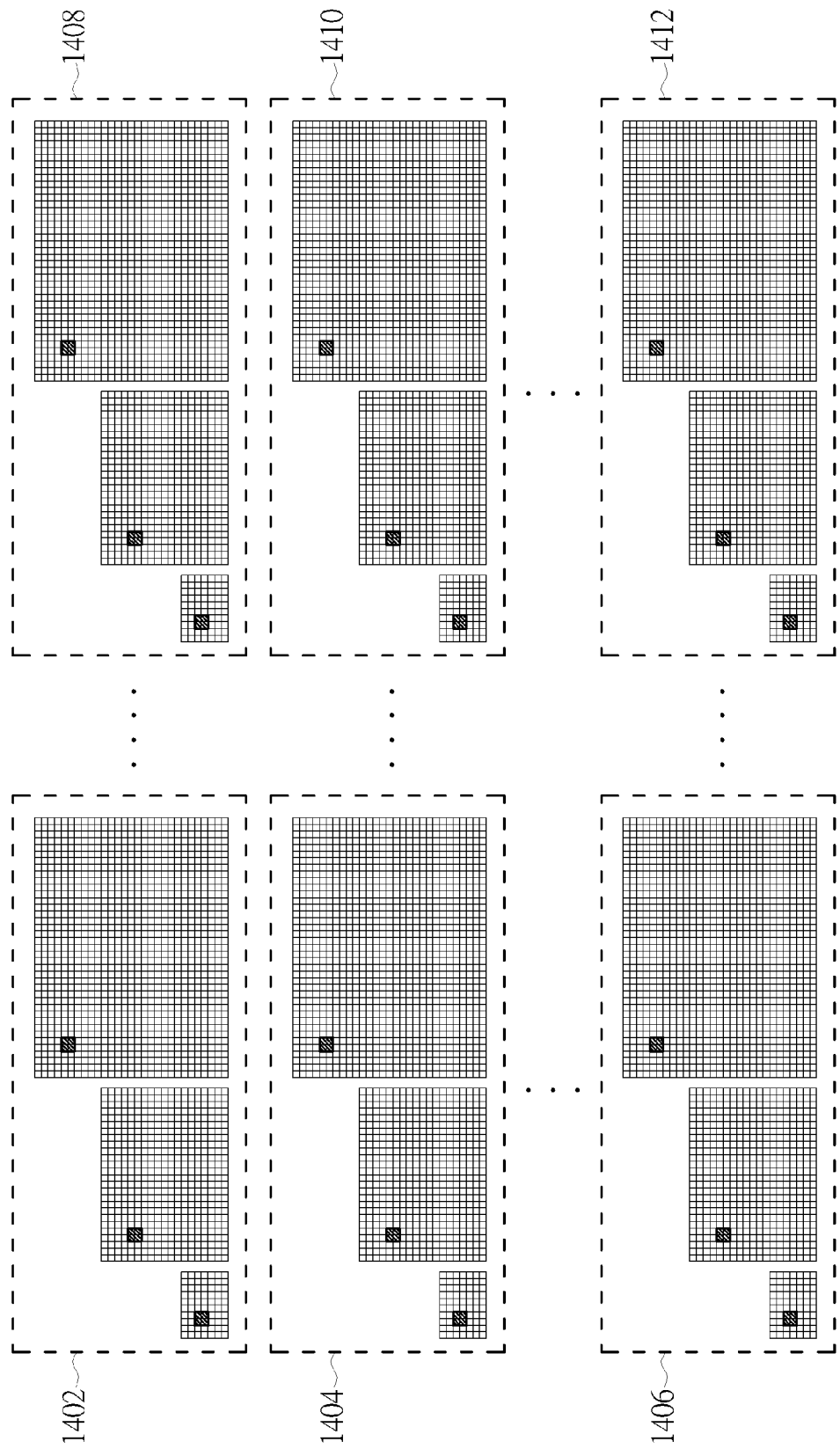
FIG. 14 is a diagram illustrating viewport zooming and movement on different 2D planes for 6DoF VR experience according to an embodiment of the present invention.

FIG. 14 is a diagram illustrating viewport zooming and movement on different 2D planes for 6DoF VR experience according to an embodiment of the present invention. Regarding each of nested sphere groups with origins located at different translational positions (x, y, z) in a 3D space, the visual pre-processing performed at the conversion circuit 114 may apply projection to omnidirectional VR contents of nested spheres with the same origin but different zooming factors to generate a projected picture group consisting of projected pictures on different 2D projected planes. As shown in FIG. 14, the projected picture groups 1402, 1404, 1406, 1408, 1410, and 1412 are generated from projection of nested sphere groups with different origins, respectively. Hence, when a user freely walking through 3D 360 VR content displayed on an HMD, 6DoF VR experience can be provided via proper viewport zooming and/or viewport movement.

For any of the VR media types beyond 3DoF, viewports that do not exist directly from the 3DoF media in the collection can be synthesized using neighboring viewports from the 3DoF media presentations.

The ISOBMFF files F/F' in FIG. 1 may include visual tracks and metadata tracks. For example, the file encapsulation circuit 118 encapsulates each of the encoding variants of the same tile into a variant track (i.e., a variant sub-picture track), and encapsulates variant tracks of all encoding variants of the same tile into the same ISOBMFF file F. The metadata Dm may include metadata directly placed in a visual track by using a track metadata box, and/or may include metadata placed in a metadata track (e.g., timed metadata track) associated with the visual track. For each of a plurality of visual tracks (e.g., variant tracks) corresponding to an omnidirectional media content of the same sphere (e.g., any sphere shown in FIG. 12), the present invention proposes adding a track group box with track_group_type equal to 'odmp' in the visual track. Note that the chosen name 'odmp' is only for illustration purpose and should not limit the invention disclosed herein. In this way, different visual tracks in the ISOBMFF files F/F' can be grouped using the proposed track group box. Specifically, the track group boxes in the visual tracks can indicate that the visual tracks correspond to the omnidirectional media content of the same sphere. Further details of the proposed omnidirectional media presentation track grouping are described as below.

Omnidirectional Media Presentation Track Grouping

Definition

TrackGroupTypeBox with track_group_type equal to 'odmp' indicates that this track belongs to an omnidirectional (or 3DoF) media presentation at a particular set of translational coordinates with an optional zooming factor. The tracks mapped to this grouping (i.e. the tracks that have the same value of track_group_id within TrackGroupTypeBox with track_group_type equal to 'odmp') collectively represent omnidirectional media content that can be presented in isolation by themselves, according to the OMAF specification. These tracks may include visual (video and image), audio, text, subtitle, application and metadata tracks that are needed for the presentation.

Syntax

```
aligned(8) class OmnidirectionalMediaPresentationBox
extends TrackGroupTypeBox('odmp') {
    unsigned int(16) position_x;
    unsigned int(16) position_y;
    unsigned int(16) position_z;
    unsigned int(4) position_unit;
    signed int(8) zooming_factor;
    unsigned int(1) limited_range_flag_x;
    unsigned int(1) limited_range_flag_y;
    unsigned int(1) limited_range_flag_z;
    unsigned int(1) reserved;
    if (limited_range_flag_x) {
        unsigned int(16) range_low_x;
        unsigned int(16) range_high_x;
    }
    if (limited_range_flag_y) {
        unsigned int(16) range_low_y;
        unsigned int(16) range_high_y;
    }
    if (limited_range_flag_z) {
        unsigned int(16) range_low_z;
        unsigned int(16) range_high_z;
    }
}
```

Semantics position_x specifies, in the units indicated by position_unit, the x-axis position of the origin of the sphere for the omnidirectional media, with respect to a default reference coordination system. When limited_range_flag_x is equal to 1, the value of position_x shall be in the range of range_low_x to range_high_x, inclusive.

position_y specifies, in the units indicated by position_unit, the y-axis position of the origin of the sphere for the omnidirectional media, with respect to a default reference coordination system. When limited_range_flag_y is equal to 1, the value of position_y shall be in the range of range_low_y to range_high_y, inclusive.

position_z specifies, in the units indicated by position_unit, the z-axis position of the origin of the sphere for the omnidirectional media, with respect to a default reference coordination system. When limited_range_flag_z is equal to 1, the value of position_z shall be in the range of range_low_z to range_high_z, inclusive.

zooming_factor specifies a zooming factor of the sphere for the omnidirectional media presentation, with respect to spheres for all other, if any, omnidirectional media presentations centered at the same origin. The value of zooming_factor shall be in the range of −100 and 100, inclusive. If there is no other omnidirectional media presentation centered at the same origin, the value of zooming_factor shall be 0. If there are more than one omnidirectional media presentations centered at the same origin, one of them shall have the value of zooming_factor equal to 0.

limited_range_flag_x, limited_range_flag_y, and limited_range_flag_z specify, respectively, if there is a position range along x-axis, y-axis and z-axis for the position of the origin of the sphere for the omnidirectional media presentation.

range_low_x and range_high_x specify, in the units indicated by position_unit, the range in the x-axis that the origin of the sphere for the omnidirectional media is within.

range_low_y and range_high_y specify, in the units indicated by position_unit, the range in the y-axis that the origin of the sphere for the omnidirectional media is within.

range_low_z and range_high_z specify, in the units indicated by position_unit, the range in the z-axis that the origin of the sphere for the omnidirectional media is within.

In accordance with the proposed omnidirectional media presentation track grouping, a track in the ISOBMFF files F/F' in FIG. 1 may be parameterized with a set of translational coordinates (position_x, position_y, position_z) in a 3D space, an optional zooming factor (zooming_factor), and a viewing space (range_low_x, range_high_x, range_low_y, range_high_y, range_low_z, and range_high_z).

As mentioned above, the file decapsulation circuit 120 receives ISOBMFF files F' from the transmission means 103. If there are no transmission errors, ISOBMFF files F' received by the file decapsulation circuit 120 should be the same as ISOBMFF files F output from the file encapsulation circuit 118. Hence, a track that is parameterized with a set of translational coordinates (position_x, position_y, position_z) in a 3D space, an optional zooming factor (zooming_factor), and a viewing space (range_low_x, range_high_x, range_low_y, range_high_y, range_low_z, and range_high_z) may be decapsulated from the ISOBMFF files F' at the file decapsulation circuit 120. In some embodiments of the present invention, tracks that are parameterized with different sets of translational coordinates may be decapsulated from the ISOBMFF files F'. In some embodiments of the present invention, tracks that are parameterized with different sets of translational coordinates but a same zooming factor may be decapsulated from the ISOBMFF files F'. In some embodiments of the present invention, tracks that are parameterized with a same set of translational coordinates but different zooming factors may be decapsulated from the ISOBMFF files F'. In some embodiments of the present invention, tracks that are parameterized with different sets of translational coordinates and different zooming factors may be decapsulated from the ISOBMFF files F'.

The viewing space (range_low_x, range_high_x, range_low_y, range_high_y, range_low_z, and range_high_z) specifies a range of a position of an origin of omnidirectional media presentation. In this example, the viewing space (range_low_x, range_high_x, range_low_y, range_high_y, range_low_z, and range_high_z) is defined by a cube. However, this is for illustrative purposes only, and is not meant to be a limitation of the present invention. Alternatively, the range limitation (i.e., viewing space) can be a sphere.

Spherical Viewing Space

Syntax

```
aligned(8) class OmnidirectionalMediaPresentationBox
extends TrackGroupTypeBox('odmp') {
    unsigned int(16) position_x;
    unsigned int(16) position_y;
    unsigned int(16) position_z;
    unsigned int(4) position_unit;
    signed int(8) zooming_factor;
    unsigned int(1) limited_range_flag_r;
    unsigned int(3) reserved;
    if (limited_range_flag_r)
        unsigned int(16) range_r;
}
```

Semantics position_x specifies, in the units indicated by position_unit, the x-axis position of the origin of the sphere for the omnidirectional media, with respect to a default reference coordination system. When limited_range_flag_x is equal to 1, the value of position_x shall be in the range of range_low_x to range_high_x, inclusive.

position_y specifies, in the units indicated by position_unit, the y-axis position of the origin of the sphere for the omnidirectional media, with respect to a default reference coordination system. When limited_range_flag_y is equal to 1, the value of position_y shall be in the range of range_low_y to range_high_y, inclusive.

position_z specifies, in the units indicated by position_unit, the z-axis position of the origin of the sphere for the omnidirectional media, with respect to a default reference coordination system. When limited_range_flag_z is equal to 1, the value of position_z shall be in the range of range_low_z to range_high_z, inclusive.

zooming_factor specifies a zooming factor of the sphere for the omnidirectional media presentation, with respect to spheres for all other, if any, omnidirectional media presentations centered at the same origin. The value of shall be in the range of −100 and 100, inclusive. If there is no other omnidirectional media presentation centered at the same origin, the value of zooming_factor shall be 0. If there are more than one omnidirectional media presentations centered at the same origin, one of them shall have the value of zooming_factor equal to 0.

limited_range_flag_r specifies if there is a radical viewing space range along the radius around the position of the origin of the sphere for the omnidirectional media presentation.

range_r specifies, in the units indicated by position_unit, a radical viewing space range limit along the radius around the origin of the sphere for the omnidirectional media is within.

Hence, a track in the ISOBMFF files F/F' in FIG. 1 may be parameterized with a set of translational coordinates (position_x, position_y, position_z) in a 3D space, an optional zooming factor (zooming_factor), and a viewing space (range_r).

As mentioned above, the file decapsulation circuit 120 receives ISOBMFF files F' from the transmission means 103. If there are no transmission errors, ISOBMFF files F' received by the file decapsulation circuit 120 should be the same as ISOBMFF files F output from the file encapsulation circuit 118. Hence, a track that is parameterized with a set of translational coordinates (position_x, position_y, position_z) in a 3D space, an optional zooming factor (zooming_factor), and a viewing space (range_r) may be decapsulated from the ISOBMFF files F' at the file decapsulation circuit 120. In some embodiments of the present invention, tracks that are parameterized with different sets of translational coordinates may be decapsulated from the ISOBMFF files F'. In some embodiments of the present invention, tracks that are parameterized with different sets of translational coordinates but a same zooming factor may be decapsulated from the ISOBMFF files F'. In some embodiments of the present invention, tracks that are parameterized with a same set of translational coordinates but different zooming factors may be decapsulated from the ISOBMFF files F'. In some embodiments of the present invention, tracks that are parameterized with different sets of translational coordinates and different zooming factors may be decapsulated from the ISOBMFF files F'.

In a first case where a zooming function is not supported and a user looking at 3D 360 VR content on an HMD wants to have 3DoF+VR experience by having head movement or want to have windowed 6DoF VR experience/omnidirectional 6DoF VR experience/6DoF VR experience by having body movement, a transition of a viewport is enabled by viewport switching between different spheres with different origins. For example, the ISOBMFF files F/F' includes a first track parameterized with a first set of translational coordinates and a second track parameterized with a second set of translational coordinates, wherein the first set of translational coordinates identifies an origin of a first omnidirectional media content (i.e., an omnidirectional media content of a first sphere), the second set of translational coordinates identifies an origin of a second omnidirectional media content (i.e., an omnidirectional media content of a second sphere), and the first set of translational coordinates is different from the second set of translational coordinates. Hence, there may be a transition of a viewport from one of the first omnidirectional media content and the second omnidirectional media content to the other of the first omnidirectional media content and the second omnidirectional media content.

In a second case where a zooming function is supported and a user looking at 3D 360 VR content on an HMD wants to have 3DoF+VR experience by having head movement without the zooming function enabled or want to have windowed 6DoF VR experience/omnidirectional 6DoF VR experience/6DoF VR experience by having body movement without the zooming function enabled, a transition of a viewport is enabled by viewport switching between different spheres with different origins but the same zooming factor. For example, the ISOBMFF files F/F' includes a first track parameterized with a first set of translational coordinates and a zooming factor, and further includes a second track parameterized with a second set of translational coordinates and the same zooming factor added to the first track, wherein the first set of translational coordinates identifies an origin of a first omnidirectional media content (i.e., an omnidirectional media content of a first sphere), the second set of translational coordinates identifies an origin of a second omnidirectional media content (i.e., an omnidirectional media content of a second sphere), and the first set of translational coordinates is different from the second set of translational coordinates. Hence, there may be a transition of a viewport from one of the first omnidirectional media content and the second omnidirectional media content to the other of the first omnidirectional media content and the second omnidirectional media content.

In a third case where a zooming function is supported and a user looking at 3D 360 VR content on an HMD wants to have 3DoF+VR experience by having head movement with the zooming function enabled or want to have windowed 6DoF VR experience/omnidirectional 6DoF VR experience/6DoF VR experience by having body movement with the zooming function enabled, a transition of a viewport is enabled by viewport switching between different spheres with different origins and different zooming factors. For example, the ISOBMFF files F/F' includes a first track parameterized with a first set of translational coordinates and a first zooming factor, and further includes a second track parameterized with a second set of translational coordinates and a second zooming factor, wherein the first set of translational coordinates identifies an origin of a first omnidirectional media content (i.e., an omnidirectional media content of a first sphere), the second set of translational coordinates identifies an origin of a second omnidirectional media content (i.e., an omnidirectional media content of a second sphere), the first set of translational coordinates is different from the second set of translational coordinates, and the first zooming factor is different from the second zooming factor. Hence, there may be a transition of a viewport from one of the first omnidirectional media content and the second omnidirectional media content to the other of the first omnidirectional media content and the second omnidirectional media content.

In a fourth case where a zooming function is supported and a user looking at 3D 360 VR content on an HMD wants to have 3DoF+VR experience by having the zooming function enabled without head movement or want to have windowed 6DoF VR experience/omnidirectional 6DoF VR experience/6DoF VR experience by having the zooming function enabled without body movement, a transition of a viewport is enabled by viewport switching between different spheres with the same origin but different zooming factors. For example, the ISOBMFF files F/F' includes a first track parameterized with a set of translational coordinates and a first zooming factor, and further includes a second track parameterized with the same set of translational coordinates added to the first track and a second zooming factor, wherein the set of translational coordinates identifies an origin of a first omnidirectional media content (i.e., an omnidirectional media content of a first sphere) as well as an origin of a second omnidirectional media content (i.e., an omnidirectional media content of a second sphere), and the first zooming factor is different from the second zooming factor. Hence, there may be a transition of a viewport from one of the first omnidirectional media content and the second omnidirectional media content to the other of the first omnidirectional media content and the second omnidirectional media content.

The track group type box in the ISOBMFF below is flexible in extending it to include additional data that are track group type specific.

```
aligned(8) class TrackGroupTypeBox(unsigned int(32)
track_group_type) extends FullBox(track_group_type, version
= 0, flags = 0)
{
    unsigned int(32) track_group_id;
    // the remaining data may be specified for a particular
track_group_type
}
```

Therefore, the omnidirectional media presentation track grouping type 'odmp' can be extended to include additional data to support more use cases. For example, for the museum touring use cases, additional attributes can be added to support inter-3DoF transition experiences with respect to video transition-in/out and audio fade-out/fade-in effects of the 3DoF media presentations and any regions in between (i.e., background). This may include introducing the following attributes and their specific data with details: transition temporal period, transition range, video transition effect modes (e.g., Dissolve, Iris, Page Peel, Slide, and 3D Motion), and Audio transition effect modes (e.g., Constant gain, Constant power, and Exponential fade).

Note that the translational coordinates are defined with respect to a default reference coordination system for the VR media presentations. If the presentations are in a system which is part of a larger system, then the origin of the system can be specified with respect to the larger system. Also, note that if more convenient, the translational coordinates can be replaced with global position, relative position and altitude information as defined in MPEG-V.

Since the track group type box in the ISOBMFF below is flexible, the present invention further proposes some improvement options for the omnidirectional media presentation track grouping. Some embodiments are detailed as below.

Switching (Zooming and Moving) from One Sphere to Another Sphere

In some examples, the method includes identifying an additional feature associated with the spherical region, wherein the additional feature comprises an inter-sphere transition effect comprising data indicative of a transition effect for a transition from one spherical media content to another spherical media content, or vice versus. For example, regarding any possible transition of a viewport as discussed above, a track included in the ISOBMFF files F/F' (e.g., the aforementioned first track and/or second track) is further parameterized with a transition effect for a transition of a viewport from one of the first omnidirectional media content and the second omnidirectional media content and the other of the first omnidirectional media content and the second omnidirectional media content, where the transition effect can include one or more of: a period of the transition; a range of a location of a spherical region (e.g., viewport) that the transition effect takes place (e.g., a range of a location of a spherical region (e.g., viewport) of the spherical media content to a second location of a second spherical region of the second spherical media content); an audio fade-out/fade-in effect for the transition; and a visual (including video, image and text) transition-in/out effect for the transition.

Note that the design disclosed herein on transition effects is mainly for illustration purpose to show how transition effects can be incorporated into omnidirectional media presentation. More detailed designs can be provided, for example, according to the transition effect models given in "The SMIL Transition Effects Module" at: https://www.w3.org/TR/1999/WD-smil-boston-19991115/transitions.html, and "Audio Effects and Transitions" at: https://helpx.adobe.com/premiere-pro/using/audio-effects-transitions.html.

Syntax

```
aligned(8) class OmnidirectionalMediaPresentationBox
extends TrackGroupTypeBox('odmp') {
    unsigned int(16) position_x;
    unsigned int(16) position_y;
    unsigned int(16) position_z;
```

```
        unsigned int(4) position_unit;
        signed int(8) zooming_factor;
        unsigned int(1) limited_range_flag_r;
        unsigned int(1) transition_effect_flag;
        unsigned int(1) reserved;
        if (limited_range_flag_r)
            unsigned int(16) range_r;
        if (transition_effect_flag_v) {
            unsigned int(16) transition_period;
            unsigned int(16) transition_range;
            unsigned int(16) transition_in_effect_visual;
            unsigned int(16) transition_out_effect_visual;
            unsigned int(16) transition_in_effect_audio;
            unsigned int(16) transition_out_effect_audio;
        }
    }
```

Semantics position_x specifies, in the units indicated by position_unit, the x-axis position of the origin of the sphere for the omnidirectional media, with respect to a default reference coordination system. When limited_range_flag_x is equal to 1, the value of position_x shall be in the range of range_low_x to range_high_x, inclusive.

position_y specifies, in the units indicated by position_unit, the y-axis position of the origin of the sphere for the omnidirectional media, with respect to a default reference coordination system. When limited_range_flag_y is equal to 1, the value of position_y shall be in the range of range_low_y to range_high_y, inclusive.

position_z specifies, in the units indicated by position_unit, the z-axis position of the origin of the sphere for the omnidirectional media, with respect to a default reference coordination system. When limited_range_flag_z is equal to 1, the value of position_z shall be in the range of range_low_z to range_high_z, inclusive.

zooming_factor specifies a zooming factor of the sphere for the omnidirectional media presentation, with respect to spheres for all other, if any, omnidirectional media presentations centered at the same origin. The value zooming_factor of shall be in the range of −100 and 100, inclusive. If there is no other omnidirectional media presentation centered at the same origin, the value of zooming_factor shall be 0. If there are more than one omnidirectional media presentations centered at the same origin, one of them shall have the value of zooming_factor equal to 0.

limited_range_flag_r specifies if there is a radical viewing range around the position of the origin of the sphere for the omnidirectional media presentation.

range_r specifies, in the units indicated by position_unit, a radical viewing space range limit along the radius around the origin of the sphere for the omnidirectional media is within.

transition_effect_flag specifies if there is any transition effect for a transition from the spherical media content to a second spherical media content for the omnidirectional media presentation.

transition_period specifies, in the units of second, a time period during which the transition effect takes place.

transition_range specifies, in the units indicated by position_unit, a range of a location of a spherical region (e.g., viewport) of the spherical media content to a second location of a second spherical region of the second spherical media content within which the transition effect takes place.

transition_in_effect_visual, transition_out_effect_visual, transition_in_effect_audio, and transition_out_effect_audio specify, respectively, visual and audio transition effect types when transition in to and out from the spherical media content. For example, transition_in_effect_visual and transition_out_effect_visual can take concatenation values of the values of "type" and"subtype" of visual transition effects defined in the "The SMIL Transition Effects Module" at: https://www.w3.org/TR/1999/WD-smil-boston-19991115/transitions.html, and transition_in_effect_audio and transition_out_effect_audio can take values of the audio effect types defined in "Audio Effects and Transitions" at: https://helpx.adobe.com/premiere-pro/using/audio-effects-transitions.html.

As mentioned above, the file decapsulation circuit 120 receives ISOBMFF files F' from the transmission means 103. If there are no transmission errors, ISOBMFF files F" received by the file decapsulation circuit 120 should be the same as ISOBMFF files F output from the file encapsulation circuit 118. Hence, a track that is further parameterized with a transition effect may be decapsulated from the ISOBMFF files F' at the file decapsulation circuit 120.

Track Derivation for VR Visual Tracks

To avoid the redundancy in coding same content, there are no bigger or smaller tiles (sub-pictures) that represent the same content of other tiles (sub-pictures). Thus, when tracks are used to encapsulate individual tiles, the lack of hierarchical structure among tracks within a file leads to a lack of hierarchical structure among tiles. All of this presents some issues when addressing properties and specifying metadata for the collection of tiles in their respective tracks.

Within ISOBMFF, there may be grouping mechanisms for tracks (and hence for tiles), through usages of boxes to label tracks and signal them as a group of tracks, an alternate group of tracks and a switch group of tracks, so that individual tracks with a same group identifier and group type belong to a same group. However, these track grouping mechanisms through labeling individual tracks present a number of issues and difficulties, when used in the context of the generic viewport dependent content flow process. These issues result from the facts that there is no single "tile" track that represents content of the variant tracks of a tile, and there is no single track that represents content of the entire spherical VR content which is projected and optionally packed to a composition of all individual "tile" tracks.

Nevertheless, when coming to situations where existing media sources are stored or encapsulated in media tracks of ISOBMFF, it is suggested in the technologies under consideration that a visual track to be constructed is a derived track identified by its containing sample entry of type 'dtrk'. A derived sample contains an ordered list of the operations to be performed on an ordered list of input images or samples. Each of the operations is specified or indicated by the TransformProperty.

Figure 15:
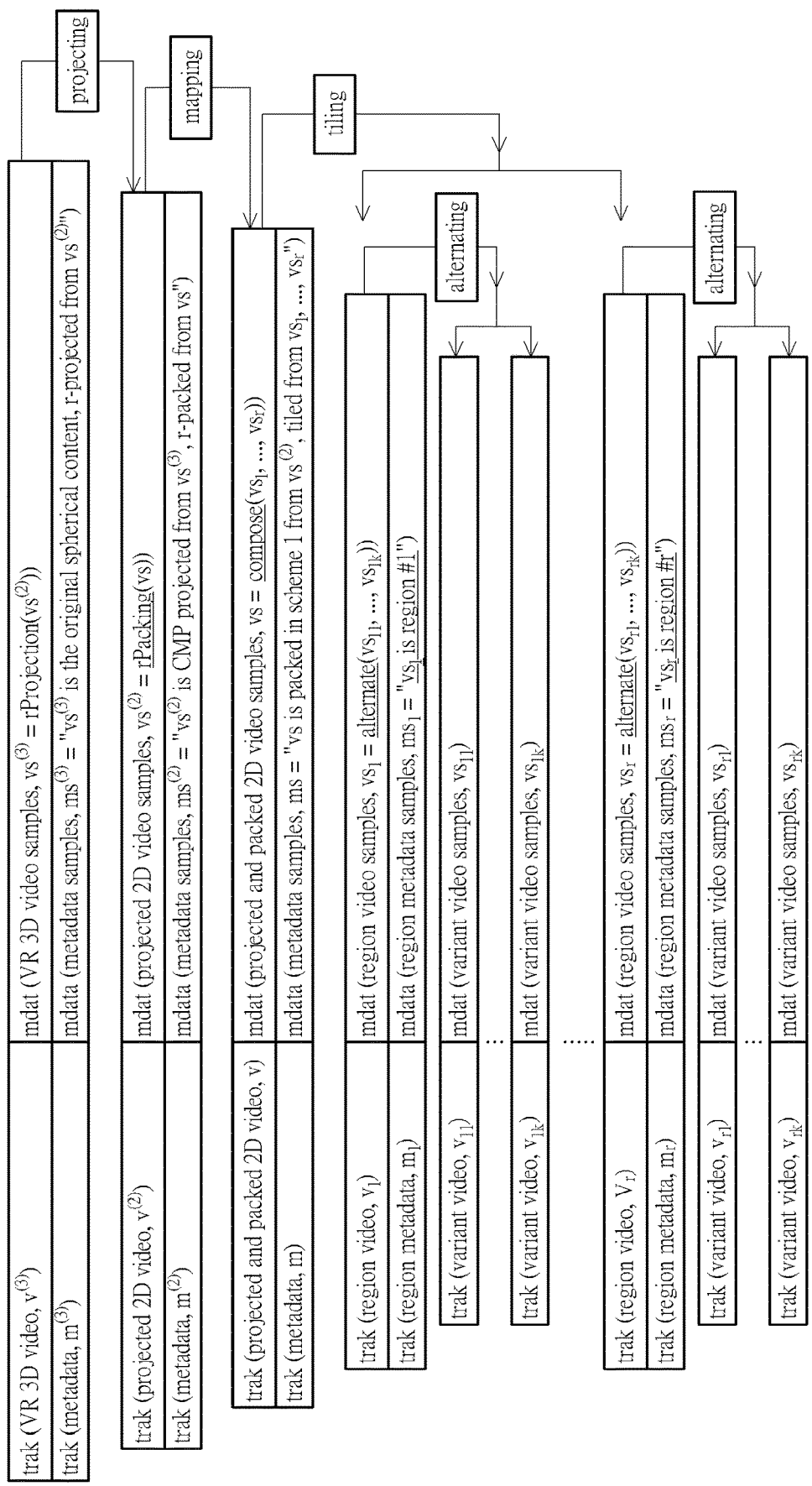
FIG. 15 is a diagram illustrating a hierarchy of tracks, based on track derivation, according to an embodiment of the present invention.

FIG. 15 is a diagram illustrating a hierarchy of tracks, based on track derivation, together with appropriate metadata associated the derived tracks according to an embodiment of the present invention. As shown in FIG. 15, there are visual tracks (which are contained in track boxes of type 'trak') $v_{11}, \ldots, v_{1k}, v_{r1}, \ldots,$ and $v_{rk}$ with media contents (which are contained in data boxes of type 'mdat')

$vs_{11}, \ldots, vs_{1k}, vs_{r1}, \ldots,$ and $vs_{rk}$, respectively. Since the media contents (which are contained in data boxes of type 'mdat') $vs_{11}, \ldots, vs_{1k}, vs_{r1}, \ldots,$ and $vs_{rk}$ are recorded in the ISOBMFF files F/F', the visual tracks $v_{11}, \ldots, v_{1k}, v_{r1}, \ldots,$ and $v_{rk}$ may be regarded as "physical" visual tracks. In addition, there are metadata tracks (not shown) that can be associated with or can make reference to the visual tracks $v_{11}, \ldots, v_{1k}, v_{r1}, \ldots,$ and $v_{rk}$ to provide metadata about media contents in the visual tracks $v_{11}, \ldots, v_{1k}, v_{r1}, \ldots,$ and $v_{rk}$.

A derived track is a logical track derived from non-derived (and possibly other derived) visual tracks in the ISOBMFF files F/F' according to a track derivation operation specified by the TransformProperty item. That is, each non-derived (or other derived) visual track has its media data recorded in the ISOBMFF files F/F', and the media data of the derived track in the ISOBMFF files F/F' are obtained from the media data of the non-derived (or other derived) visual tracks via track derivation. As shown in FIG. 15, a derived track (which is contained in a track box of type 'trak') with the media content is derived from a transformation operation specified or indicated by the Transform-Property item (e.g., 'alternate', 'compose', 'rPacking', or 'rProjection'). In addition, a metadata track (which is contained in a data box of type 'mdat') with a media content can be associated with or can make reference to the derived track to provide metadata about the media content in the derived track. The metadata track may be a timed metadata track.

As shown in FIG. 15, the composite tracks $v, v_1, \ldots,$ and $v_r$ are derived from other tracks $v_{11}, \ldots, v_{1k}, \ldots, v_{r1}, \ldots,$ and $v_{rk}$, where each $v_l$, $l=1, \ldots, r$, is an alternate of its variants, $v_{l1}$, $j=1, \ldots, k$, either switchable or not switchable at the sample level, and $v$ is a composite of all $v_1, \ldots,$ and $v_r$. With these derived tracks, metadata tracks (e.g., timed metadata tracks) $m, m_1, \ldots,$ and $m_r$ can be associated with or can make reference to them to provide metadata about media content in these tracks.

Derived tracks may be obtained from other (non-derived and/or derived) tracks using projection, reverse projection, packing (mapping) and/or reverse packing (reverse mapping) transformations. Hence, the ISOBMFF files F generated from the file encapsulation circuit 118 at the VR service provider end (i.e., source electronic device 102) can include a TransformProperty item that instructs track derivation arranged to obtain a derived track from at least one visual track (e.g., non-derived track(s) or derived track(s)), where the TransformProperty item is set to enable one of a projection transformation (which may be forward projection or reverse projection) and a packing transformation (which may be forward packing (mapping) or reverse packing (reverse mapping)) in the track derivation. Similarly, the ISOBMFF files F' received by the file decapsulation circuit 120 at the VR application end (i.e., destination electronic device 104) can include a TransformProperty item that is set to enable one of a projection transformation (which may be forward projection or reverse projection) and a packing transformation (which may be forward packing (mapping) or reverse packing (reverse mapping)) in track derivation. As shown in FIG. 15, the derived track $v^{(2)}$ is derived from the composite track v by reverse packing (reverse mapping), and the derived track $v^{(3)}$ is derived from the derived track $v^{(2)}$ by reverse projection.

The 3DoF media presentation track grouping mechanism has an efficiency issue inherited from the track grouping mechanism, largely due to the lack of track hierarchy in the ISOBMFF; that is, it requires all tracks related to a 3DoF media presentation to carry the track group boxes. This becomes especially tedious, for example, when VR video is encoded in many sub-picture tracks (i.e., variant tracks) with multiple quality variants.

The VR visual track derivation mechanisms for VR media provide a remedy to this situation. Derived tracks have a number of advantages, including:

1. Derived tracks are tracks themselves, except their media data are to be derived.
2. Derived tracks are logical, introducing no media content overhead or duplication.
3. Track derivation is on demand in nature; that is, it is on the needed basis.
4. Derived tracks can be naturally grouped with and referenced by other related tracks, such as related audio, text, application and metadata tracks.

For instance, as shown in FIG. 15, starting with "physical" multiple variant region tracks $v_{11}, \ldots, v_{1k}, \ldots, v_{r1}, \ldots,$ and $v_{rk}$, a track hierarchy can be established for region (sub-picture or tile), projected and packed 2D, projected 2D, and VR 3D video tracks, with appropriate metadata tracks associated with them. Clearly, using derived VR video tracks will make the 3DoF media presentation track grouping much more appropriate, logical and efficient; one only needs to place the 3DoF media presentation track group boxes into the derived (3DoF) VR video tracks $V^{(3)}$, rather than in each and every variant region video track $v_{11}, \ldots, v_{1k}, \ldots, v_{r1}, \ldots, v_{rk}$. Hence, within the ISOBMFF files F/F', none of the variant tracks $v_{11}, \ldots, v_{1k}, \ldots, v_{r1}, \ldots,$ and $v_{rk}$ having respective media data $vs_{11}, \ldots, vs_{1k}, \ldots, vS_{r1}, \ldots,$ and $vs_{rk}$ is parameterized with a set of translational coordinates and an optional zooming factor, while the derived track $V^{(3)}$ with media data obtained from the variant tracks $v_{11}, \ldots, v_{1k}, \ldots, v_{r1}, \ldots, v_{rk}$ via track derivation is parameterized with a set of translational coordinates and an optional zooming factor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
    receiving at least one virtual reality (VR) content;
    obtaining at least one picture from said at least one VR content;
    encoding said at least one picture to generate a part of a coded bitstream; and
    encapsulating, by a file encapsulation circuit, the part of the coded bitstream into at least one ISO Base Media File Format (ISOBMFF) file, wherein said at least one ISOBMFF file comprises:
    a first track parameterized with a first set of translational coordinates, wherein, and the first set of translational coordinates identifies a first origin of a first omnidirectional media content of the VR content;
    a second track parameterized with a second set of translational coordinates associated with second omnidirectional media content of the VR content that is different than the first omnidirectional media content, wherein the second set of translational coordinates identifies a second origin of the second omnidirectional media content; and
    at least one of the first track and the second track is further parameterized with a transition effect for a transition of a viewport from one of the first omnidirectional media content and the second omnidirectional media content to another of the first omnidirectional media content and the second omnidirectional media content, wherein the transition effect comprises at least one of a period of the transition, a range of a location of a spherical region that the transition effect takes place, an audio effect of the transition, and a visual effect of the transition; and wherein:

the first omnidirectional media content and the second omnidirectional media content are each associated with one or more nested sphere groups of a plurality of nested sphere groups; and each nested sphere group of the plurality of nested sphere groups comprises an associated origin at a position in 3D space, wherein the associated origin is different than origins of other nested sphere groups of the plurality of nested sphere groups.

2. The video processing method of claim 1, wherein the second set of translational coordinates is different from the first set of translational coordinates.

3. The video processing method of claim 1, wherein the first track is further parameterized with a first zooming factor associated with the first omnidirectional media content.

4. The video processing method of claim 3, wherein the second track is further parameterized with a second zooming factor associated with the second omnidirectional media content, the second set of translational coordinates is different from the first set of translational coordinates, and the second zooming factor is equal to the first zooming factor.

5. The video processing method of claim 3, wherein the second track is further parameterized with a second zooming factor associated with the second omnidirectional media content, the second set of translational coordinates is different from the first set of translational coordinates, and the second zooming factor is different from the first zooming factor.

6. The video processing method of claim 3, wherein the second track is further parameterized with a second zooming factor, the second set of translational coordinates is equal to the first set of translational coordinates, and the second zooming factor is different from the first zooming factor.

7. The video processing method of claim 1, wherein the first track is further parameterized with a viewing space that specifies a range of a position of the first origin.

8. The video processing method of claim 7, wherein the viewing space is a cube.

9. The video processing method of claim 7, wherein the viewing space is a sphere.

10. The video processing method of claim 1, wherein said at least one ISOBMFF file further comprises at least one visual track each having media data recorded in said at least one ISOBMFF file, the first track is a derived track whose media data is obtained from said at least one visual track via track derivation, and none of said at least one visual track is parameterized with a set of translational coordinates.

11. The video processing method of claim 10, wherein each of said at least one visual track has said media data obtained from encoding only a spatial portion of the first omnidirectional media content.

12. A video processing apparatus comprising:
a conversion circuit, arranged to receive at least one virtual reality (VR) content, and obtain at least one picture from said at least one VR content;
a video encoder, arranged to encode said at least one picture to generate a part of a coded bitstream; and
a file encapsulation circuit, arranged to encapsulate the part of the coded bitstream into at least one ISO Base Media File Format (ISOBMFF) file, wherein said at least one ISOBMFF file comprises:
a first track parameterized with a first set of translational coordinates, whereinand the first set of translational coordinates identifies a first origin of a first omnidirectional media content of the VR content;
a second track parameterized with a second set of translational coordinates associated with second omnidirectional media content of the VR content that is different than the first omnidirectional media content, wherein the second set of translational coordinates identifies a second origin of a second omnidirectional media content; and
at least one of the first track and the second track is further parameterized with a transition effect for a transition of a viewport from one of the first omnidirectional media content and the second omnidirectional media content to another of the first omnidirectional media content and the second omnidirectional media content,
wherein the transition effect comprises at least one of a period of the transition, a range of a location of a spherical region that the transition effect takes place, an audio effect of the transition, and a visual effect of the transition; and wherein:
the first omnidirectional media content and the second omnidirectional media content are each associated with one or more nested sphere groups of a plurality of nested sphere groups; and
each nested sphere group of the plurality of nested sphere groups comprises an associated origin at a position in 3D space, wherein the associated origin is different than origins of other nested sphere groups of the plurality of nested sphere groups.

13. The video processing method of claim 1, wherein: the first omnidirectional media content is associated with a first sphere of a nested sphere group of the associated one or more nested sphere groups; and
the second omnidirectional media content is associated with a second sphere of the nested sphere group.

14. The video processing method of claim 4, wherein: the first omnidirectional media content is associated with a first nested sphere group of the associated one or more nested sphere groups; and
the second omnidirectional media content is associated with a second nested sphere group of the associated one or more nested sphere groups that is different than the first nested sphere group.

15. The video processing method of claim 5, wherein: the first omnidirectional media content and the second omnidirectional media content are each associated with a same nested sphere group of a plurality of nested sphere groups.

16. The video processing apparatus of claim 12, wherein: the first track is further parameterized with a first zooming factor associated with the first omnidirectional media content; the second track is further parameterized with a second zooming factor associated with the second omnidirectional media content; the second set of translational coordinates is different from the first set of translational coordinates; and the second zooming factor is equal to the first zooming factor.

17. The video processing apparatus of claim 16, wherein: the first omnidirectional media content is associated with a first nested sphere group of the one or more associated nested sphere groups; and
the second omnidirectional media content is associated with a second nested sphere group of the one or more associated nested sphere groups that is different than the first nested sphere group.

18. The video processing apparatus of claim 12, wherein: the first track is further parameterized with a first zooming factor associated with the first omnidirectional media content; the second track is further parameterized with a second zooming factor associated with the second omnidirectional media content; the second set of translational coordinates is different from the first set of translational coordinates: and the second zooming factor is different from the first zooming factor.

19. The video processing apparatus of claim 18, wherein: the first omnidirectional media content and the second omnidirectional media content are each associated with a same nested sphere group of a plurality of nested sphere groups.

\* \* \* \* \*